United States Patent
Park

(10) Patent No.: US 12,175,311 B2
(45) Date of Patent: Dec. 24, 2024

(54) APPLICATION CODE MANAGEMENT USING AN EVENT STREAM

(71) Applicant: IEX Group, Inc., New York, NY (US)

(72) Inventor: Robert Park, New York, NY (US)

(73) Assignee: IEX Group, Inc., New York, NY (US)

(*) Notice: Subject to any disclaimer, the term of this patent is extended or adjusted under 35 U.S.C. 154(b) by 115 days.

(21) Appl. No.: 17/145,971

(22) Filed: Jan. 11, 2021

(65) Prior Publication Data

US 2022/0222132 A1 Jul. 14, 2022

(51) Int. Cl.
G06F 9/54 (2006.01)
G06F 8/65 (2018.01)
G06F 8/71 (2018.01)

(52) U.S. Cl.
CPC ............... *G06F 9/546* (2013.01); *G06F 8/65* (2013.01); *G06F 8/71* (2013.01); *G06F 2209/548* (2013.01)

(58) Field of Classification Search
CPC ... G06F 9/546; G06F 8/65; G06F 8/71; G06F 2209/548
See application file for complete search history.

(56) References Cited

U.S. PATENT DOCUMENTS

| | | | |
|---|---|---|---|
| 4,736,294 A | 4/1988 | Gill et al. |
| 6,327,630 B1 | 12/2001 | Carroll et al. |
| 7,162,510 B2 | 1/2007 | Jammes |
| 7,162,524 B2 | 1/2007 | Astley et al. |
| 7,487,216 B2 | 2/2009 | Miller et al. |
| 7,621,447 B1 | 11/2009 | Sarma et al. |
| 7,680,838 B1 | 3/2010 | Shaw |
| 8,014,296 B1 | 9/2011 | Chisholm et al. |
| 8,150,988 B2 | 4/2012 | Pardo-castellote et al. |
| 8,301,547 B2 | 10/2012 | Sulavka |
| 8,392,473 B2 | 3/2013 | Thomson et al. |
| 8,489,747 B2 | 7/2013 | Aisen et al. |
| 8,589,260 B2 | 11/2013 | Chambers et al. |
| 8,914,809 B1 | 12/2014 | Cohen |
| 8,984,137 B2 | 3/2015 | Aisen et al. |

(Continued)

FOREIGN PATENT DOCUMENTS

| | | |
|---|---|---|
| AU | 2010330629 | 2/2012 |
| AU | 2016200212 | 2/2016 |

(Continued)

OTHER PUBLICATIONS

"Schematic Auction Process PDQ ATS", PDQ Web Site, https://web.archive.org/web/20150930073841, /http://www.pdqats.com/platform/process/ Sep. 30, 2015, 1 page.

(Continued)

*Primary Examiner* — Kevin L Young
*Assistant Examiner* — Kimberly L Jordan
(74) *Attorney, Agent, or Firm* — Goodwin Procter LLP

(57) ABSTRACT

In a processing system, an identifier for a current version of code for an application is published in a message to a shared event stream. Any instances of the application within the processing system may update to the current version before processing other messages having sequence numbers after the message containing the identifier. In this manner, multiple instances of the application may be periodically updated to maintain global consistency of the application and the shared event stream.

26 Claims, 6 Drawing Sheets

(56) References Cited

U.S. PATENT DOCUMENTS

| | | | |
|---|---|---|---|
| 9,082,119 B2 | 7/2015 | Ortiz et al. | |
| 9,137,329 B2 | 9/2015 | Xu | |
| 9,553,831 B2 | 1/2017 | Pignataro et al. | |
| 9,612,888 B2 | 4/2017 | Marappan | |
| 9,712,606 B2 | 7/2017 | Färnlöf et al. | |
| 9,922,436 B2 | 3/2018 | Iannaccone et al. | |
| 9,928,548 B2 | 3/2018 | Schmidt et al. | |
| 9,940,670 B2 | 4/2018 | Aisen et al. | |
| 9,959,572 B2 | 5/2018 | Iannaccone et al. | |
| 9,973,306 B2 | 5/2018 | Bray et al. | |
| 10,127,612 B2 | 11/2018 | Mannix | |
| 2002/0194365 A1 | 12/2002 | Jammes | |
| 2004/0003064 A1 | 1/2004 | Astley et al. | |
| 2006/0146991 A1 | 7/2006 | Thompson et al. | |
| 2007/0198397 A1 | 8/2007 | Mcginley et al. | |
| 2008/0114839 A1* | 5/2008 | Borgendale | G06F 9/546 |
| | | | 709/206 |
| 2010/0332650 A1 | 12/2010 | Aisen et al. | |
| 2011/0185074 A1 | 7/2011 | Pardo-castellote et al. | |
| 2012/0166327 A1 | 6/2012 | Amicangioli | |
| 2012/0219283 A1 | 8/2012 | Sokolowski | |
| 2012/0221396 A1 | 8/2012 | Eglen et al. | |
| 2014/0019323 A1 | 1/2014 | Blake | |
| 2014/0025321 A1 | 1/2014 | Spanier | |
| 2014/0136595 A1 | 5/2014 | Xu | |
| 2014/0279552 A1 | 9/2014 | Ortiz et al. | |
| 2014/0310358 A1 | 10/2014 | Pignataro et al. | |
| 2015/0235212 A1 | 8/2015 | Ortiz et al. | |
| 2015/0261625 A1* | 9/2015 | Cape | G06F 11/1658 |
| | | | 714/19 |
| 2015/0341422 A1 | 11/2015 | Färnlöf et al. | |
| 2016/0019536 A1 | 1/2016 | Ortiz et al. | |
| 2016/0104155 A1 | 4/2016 | Mcgaugh et al. | |
| 2016/0173364 A1 | 6/2016 | Pitio et al. | |
| 2016/0182330 A1 | 6/2016 | Iannaccone et al. | |
| 2016/0189260 A1 | 6/2016 | Nagla | |
| 2016/0205174 A1 | 7/2016 | Pitio et al. | |
| 2016/0210626 A1 | 7/2016 | Ortiz et al. | |
| 2016/0239355 A1 | 8/2016 | Marappan | |
| 2016/0260173 A1 | 9/2016 | Aisen et al. | |
| 2016/0267082 A1 | 9/2016 | Wong et al. | |
| 2016/0277348 A1 | 9/2016 | Pitio | |
| 2017/0017958 A1 | 1/2017 | Scott et al. | |
| 2017/0039648 A1 | 2/2017 | Aisen et al. | |
| 2017/0097973 A1 | 4/2017 | Iannaccone et al. | |
| 2017/0124494 A1 | 5/2017 | Hristoskov et al. | |
| 2017/0161735 A1 | 6/2017 | Ortiz et al. | |
| 2017/0186085 A1 | 6/2017 | Nagla | |
| 2017/0249622 A1 | 8/2017 | Ortiz et al. | |
| 2017/0279736 A1 | 9/2017 | Pitio et al. | |
| 2017/0330181 A1 | 11/2017 | Ortiz | |
| 2018/0018723 A1 | 1/2018 | Nagla et al. | |
| 2018/0047065 A1 | 2/2018 | Wildberger | |
| 2018/0054363 A1 | 2/2018 | Ngampornsukswadi et al. | |
| 2018/0067864 A1* | 3/2018 | Park | G01R 22/063 |
| 2018/0075527 A1 | 3/2018 | Nagla et al. | |
| 2018/0082678 A1 | 3/2018 | Olmstead et al. | |
| 2018/0158143 A1 | 6/2018 | Schmitt et al. | |
| 2019/0087898 A1 | 3/2019 | Mannix | |
| 2020/0272569 A1* | 8/2020 | Park | H04L 9/40 |

FOREIGN PATENT DOCUMENTS

| | | |
|---|---|---|
| AU | 2016231624 | 10/2016 |
| AU | 2015327722 | 4/2017 |
| AU | 2015330644 | 4/2017 |
| AU | 2016208989 | 8/2017 |
| AU | 2016224908 | 9/2017 |
| AU | 2016287789 | 2/2018 |
| BR | 1120120138 91 | 5/2016 |
| CA | 2707196 | 1/2011 |
| CA | 2927532 | 1/2011 |
| CA | 2927607 | 1/2011 |
| CA | 2681251 | 3/2011 |
| CA | 2706252 | 3/2011 |
| CA | 2777438 | 11/2012 |
| CA | 2830260 | 4/2014 |
| CA | 2844318 | 9/2014 |
| CA | 2961916 | 4/2016 |
| CA | 2963287 | 4/2016 |
| CA | 2913700 | 6/2016 |
| CA | 2916284 | 6/2016 |
| CA | 2970743 | 6/2016 |
| CA | 2974151 | 7/2016 |
| CA | 2922072 | 8/2016 |
| CA | 2978488 | 9/2016 |
| CA | 2980196 | 9/2016 |
| CA | 2991073 | 1/2017 |
| CA | 2910754 | 4/2017 |
| CA | 3000464 | 4/2017 |
| CA | 3000466 | 4/2017 |
| CA | 2952874 | 6/2017 |
| CA | 2970686 | 12/2017 |
| CA | 2976505 | 2/2018 |
| CA | 2976618 | 2/2018 |
| CA | 2963767 | 3/2018 |
| CN | 105978756 | 9/2016 |
| CN | 107004190 | 8/2017 |
| CN | 107004195 | 8/2017 |
| CN | 107408253 | 11/2017 |
| EP | 2510451 | 10/2012 |
| EP | 3201856 | 8/2017 |
| EP | 3234792 | 10/2017 |
| EP | 3248159 | 11/2017 |
| EP | 3260979 | 12/2017 |
| EP | 3269090 | 1/2018 |
| EP | 3272082 | 1/2018 |
| EP | 3317833 | 5/2018 |
| KR | 20020012538 | 2/2002 |
| KR | 20120092880 | 8/2012 |
| KR | 20150005428 | 1/2015 |
| KR | 20150130243 | 11/2015 |
| KR | 2018002649 8 | 3/2018 |
| MX | 2012006659 | 1/2013 |
| MX | 2017011021 | 1/2018 |
| SG | 10201704581V | 7/2017 |
| SG | 11201707004 W | 9/2017 |
| WO | WO-2000050974 | 8/2000 |
| WO | WO-2011069234 | 6/2011 |
| WO | WO-2016049745 | 4/2016 |
| WO | WO-2016054727 | 4/2016 |
| WO | WO-2016095012 | 6/2016 |
| WO | WO-2016115620 | 7/2016 |
| WO | WO-2016135705 | 9/2016 |
| WO | WO-2016141491 | 9/2016 |
| WO | WO-2016149807 | 9/2016 |
| WO | WO-2017000061 | 1/2017 |
| WO | WO-2017054094 | 4/2017 |
| WO | WO-2017054095 | 4/2017 |
| WO | WO-2017136956 | 8/2017 |
| WO | WO-2017143435 | 8/2017 |
| WO | WO-2017152265 | 9/2017 |
| WO | WO-2018010009 | 1/2018 |
| WO | WO-2018014123 | 1/2018 |
| WO | WO- 2018049523 | 3/2018 |
| ZA | 201205093 | 2/2014 |

OTHER PUBLICATIONS

Schmerken, Ivy , "PDQ ATS Launches a New Electronic Equity Auction for Large Orders", InformationWeek WallStreet & Technology, http://www.pdqats.com/pdq-ats-launches-a-new-electronic-equity-auction-for-large-orders/ Sep. 22, 2014 , 1-4 pages.

"TMX Group to Streamline its Equities Trading Offering", TMX Press Release, https://www.tmx.com/newsroom/press-releases?id=203&year=2014&month=Oct. 10, 23, 2014 , 2 pages.

"Chicago Fed Warned on High-Frequency Trading, SEC Slow to Respond", Reuters Hedgeworld, New York, https://search.proquest.com/docview/1081511083?accountid=14753 Oct. 1, 2012 , 4 pages.

Klein, Greg , "HFT speed bump gets green light as OSC approves Aequitas Neo Exchange", Resource Clips http://resourceclips.com/

(56) References Cited

OTHER PUBLICATIONS

2014/11/17/hft-speed-bump-gets-green-light-as-osc-approves-aequitas-neo-exchange/ Nov. 17, 2014, 1-2 pages.
Ongaro, Diego et al., "In Search of an Understandable Consensus Algorithm (Extended Version)", Stanford University, tech report, published on May 20, 2014, "Usenix Annual Tech. Conference on Jun. 19-20, 2014, Philadelphia, PA" May 20, 2014, pp. 1-18.
Castaldo, Joe, "How Aequitas plans to build a kinder gentler stock market", Canadian Business, http://www.canadianbusiness.com/innovation/aequitas-vs-hft/ Mar. 26, 2015, 1-12 pages.
Marcus, Dan, "Market Structure Evolution", ParFx press release, https://www.parfx.com/news/press-releases/market-structure-evolution-by-dan-marcus-ceo-parfx/ Mar. 13, 2015, 1-6 pages.
"Application for Recognition of Aequitas Neo Exchange Inc.", (Aequitas Neo Exchange) and its parent company, Aequitas Innovations Inc. (Aequitas), of Notice and Request for Comment, Ontario Securities Commission, https://www.osc.gov.on.ca/documents/en/Marketplaces/xxr-aequitas_20140627nrfc-application2.pdf Jun. 27, 2014, 1-41 pages.
Nakamoto, Satoshi, "Bitcoin: A Peer-to-Peer Electronic Cash System", www.bitcoin.org Jul. 4, 2010, pp. 1-9.
"New Trading Platform to Tackle HFT", Compliance Reporter, London, https://search.proquest.com/docview/1081511083?accountid=14753 Jul. 29, 2013, 4 pages.
"Upstart Trading Platform Pitches Itself as a Sanctum", Dow Jones Institutional News; New York, https://search.proquest.com/docview/2092612293?accountid=14753 Jul. 29, 2013, 3 Pages.
"Third-party Submission Under 37CFR 1.290 for U.S. Appl. No. 14/688,463", filed Apr. 22, 2016, 18 pages.
"Third-party Submission Under 37CFR 1.290 for U.S. Appl. No. 14/688,463", filed Apr. 22, 2016, 13 Pages.
"Notice of Filing of Proposed Rule Change to Modify Exchange Rule 3307 to Institute a Five Millisecond Delay in the Execution Time of Marketable Orders on NASDAW OMX PSX", U.S. Securities and Exchange Commission. File No. SR-Phlx-2012-106 Release No. 34-67680, https://www.sec.gov/rules/sro/phlx/2012/34-67680 Aug. 17, 2012, 1-12 pages.
"Innovative Design to Promote Liquidity Formation", Aequitas NEO Exchange Web Site, https://web.archive.org/web/20150405131256/https://www.aequitasneoexchange.com/en/trading/trading-solutions/neo-book/ Apr. 5, 2015, 1-2 pages.
Parfx, "About ParFX", https://web.archive.org/web/20130911210916/http:/www.parfx.com/about-parfx Sep. 13, 2013, 2 pages.
ISA, "PCT International Search Report, PCT Application No. PCT/US16/55345", Dec. 15, 2016, 2 pages.
ISA, "PCT Written Opinion, PCT Application No. PCT/US16/55345", Dec. 15, 2016, 7 Pages.
ISA, "PCT International Search Report, PCT Application No. PCT/US17/49000", Nov. 7, 2017, 2 pages.
ISA, "PCT Written Opinion, PCT Application No. PCT/US17/49000", Nov. 7, 2017, 7 Pages.
USPTO, "U.S. Appl. No. 15/687,707 Non-Final Office Action mailed Mar. 27, 2019", 15 pages.
USPTO, "U.S. Appl. No. 15/687,707 Non-Final Office Action mailed Sep. 25, 2019", 14 pages.
USPTO, "U.S. Appl. No. 15/687,707 Notice of Allowance mailed Jan. 29, 2020", 7 Pages.
USPTO, "U.S. Appl. No. 16/872,647 Notice of Allowance mailed Sep. 28, 2020", 10 pages.
Lamport, Leslie, "The Part-Time Parliament", ACM Transactions on Computer Systems 16, May 2, 1998, pp. 133-169.
Schmerken, Ivy, "EBSs Plan to Slow Down HFT in FX Could Influence Other Regulators", InformationWeek WallStreet & Technology, http://www.wallstreetandtech.com/exchanges/ebss-plan-to-show-down-hft-in-fx-could-influence-other-regulators/a/d-id/1268077 Apr. 29, 2013, 1-2 pages.
"IEX Cloud", Jan. 9, 2021 (Jan. 9, 2021), XP055896948, Retrieved from the Internet: URL: https:llweb.archive.org/web/20210109073750/https://iexcloud.io/docs/api/; 248 pages.
International Search Report and Written Opinion for PCT/US2021/064696 dated Mar. 18, 2022; 13 pages.

* cited by examiner

APPLICATION CODE MANAGEMENT USING AN EVENT STREAM

CROSS-REFERENCE TO RELATED APPLICATIONS

This application is related to U.S. patent application Ser. No. 17/145,917, entitled "Schema Management Using an Event Stream," filed on Jan. 11, 2021, and incorporated by reference herein in its entirety.

TECHNICAL FIELD

This disclosure relates to managing event streams in a shared computer environment, and more specifically to techniques for updating schemas for data communicated on the event stream and application logic for applications using the event stream.

BACKGROUND

A shared event stream provides a useful medium for globally ordering messages from different sources at high speed. This can support high throughput and low latency when processing transactions or other information within a local computing environment, a distributed computing environment, or some combination of these. However, users of the event stream may periodically want or need to change the format in which they share data, or the manner in which they process data. There remains a need for techniques by which a user of the event stream can update how data is shared or processed in a time-based manner synchronized with the event stream so that other users can reliably encode and decode event stream messages.

SUMMARY

In a message processing system, an application connected to an event stream publishes a schema for the structure of data payloads contained in messages from the application. Other readers and writers within the system can receive the schema and apply the schema to subsequent inbound and/or outbound messages as appropriate. The application may from time to time dynamically update the schema and publish a revised schema for use by the other applications connected to the event stream for subsequent messages. In another aspect, the application may receive code update instructions or identify code versions using the event stream.

In an aspect, a method disclosed herein includes: reading sequenced messages from an event stream, the sequenced messages having globally unique sequence numbers within the event stream; processing the sequenced messages with an application to provide a first number of unsequenced messages responsive to the sequenced messages, where the application generates messages using a first schema identified by a first schema identifier; writing the first number of unsequenced messages to the event stream without globally unique sequence numbers using a first data structure specified by the first schema; revising the first data structure to provide a second data structure specified by a second schema; writing a schema change message to the event stream with a second schema identifier that identifies the second schema; and, after writing the schema change message to the event stream and receiving a sequenced version of the schema change message on the event stream, writing a second number of unsequenced messages to the event stream using the second data structure specified by the second schema.

Implementations may include one or more of the following features. The globally unique sequence numbers may be monotonically increasing numbers assigned by a sequencer for the event stream according to a time received by the sequencer. The method may further include adding a time stamp to each of the sequenced messages with the sequencer. The method may further include, in response to receiving a second schema change message with one of the globally unique sequence numbers on the event stream from a second application, applying a corresponding schema to one or more sequenced messages from the second application that have reference sequence numbers greater than or equal to the one of the globally unique sequence numbers for the second schema change message. The method may further comprise including a corresponding one of the first schema identifier or the second schema identifier in each of the unsequenced messages from the application. The method may further include executing a plurality of instances of the application at a plurality of venues coupled in a communicating relationship with the event stream. The method may further include digitally signing each of the unsequenced messages before writing to the event stream. The method may further include filtering the sequenced messages to remove one or more of the sequenced messages from a local queue for the application. The application may process the sequenced messages with an order of execution determined by the globally unique sequence numbers. The method may further include processing one of the sequenced messages from the application sourcing the schema change message with a second application, where the second application uses the first schema when a reference sequence number for the one of the sequenced messages is less than the globally unique sequence number for the schema change message, and where the second application uses the second schema when the reference sequence number for the one of the sequenced messages is equal to or greater than the globally unique sequence number for the schema change message. The method may further include sequencing messages on the event stream with a sequencer by: reading unsequenced messages from the event stream, applying a time stamp to each of the unsequenced messages corresponding to a time received at the sequencer, arranging the unsequenced messages in a chronological order according to the time received at the sequencer, assigning monotonically increasing sequence numbers according to the chronological order to the unsequenced messages as the globally unique sequence numbers, and writing the unsequenced messages with the monotonically increasing sequence numbers to the event stream as sequenced messages. The method may further include processing an inbound message to the application using an updated schema from a source application based on all applicable schema update messages having globally unique sequence identifiers up to and including a reference sequence number for the inbound message. The method may further include writing an outbound message from the application using an updated schema for the application based on all applicable schema update messages having globally unique sequence identifiers up to and including a reference sequence number for the outbound message.

In an aspect, a computer program product disclosed herein includes computer executable code embodied in a non-transitory computer readable medium that, when executing on one or more computing devices, updates schemas used in messages among users of an event stream by performing the steps of: reading sequenced messages from the event stream, the sequenced messages including sequence numbers; processing the sequenced messages with an application to provide a first number of unsequenced messages responsive to the sequenced messages, where the application generates messages using a first schema identified by a first schema identifier; writing the first number of unsequenced messages to the event stream without sequence numbers using a first data structure specified by the first schema, each unsequenced message including a digital signature for authenticating the application; revising the first data structure to provide a second data structure specified by a second schema; writing a schema change message to the event stream with a second schema identifier that identifies the second schema; and, after writing the schema change message to the event stream and receiving a sequenced version of the schema change message on the event stream, writing a second number of unsequenced messages to the event stream using the second data structure specified by the second schema.

Implementations may include one or more of the following features. The computer program product may further include code that sequences messages on the event stream by performing the steps of: reading unsequenced messages from the event stream, applying a time stamp to each of the unsequenced messages corresponding to a time received at a sequencer, arranging the unsequenced messages in a chronological order according to the time received at the sequencer, assigning monotonically increasing sequence numbers to the unsequenced messages as the sequence numbers according to the chronological order, and writing the unsequenced messages with the monotonically increasing sequence numbers to the event stream as sequenced messages. The sequence numbers may be monotonically increasing numbers assigned by the sequencer for the event stream according to a time received by the sequencer. The computer program product may further include code that performs the step of adding a time stamp to each of the sequenced messages with the sequencer. Each of the sequence numbers may be a globally unique sequence number within the event stream. The computer program product may further include code that performs the step of, in response to receiving a second schema change message with one of the sequence numbers on the event stream from a second application, applying a corresponding schema to one or more sequenced messages from the second application having a reference sequence number greater than or equal to the one of the sequence numbers for the second schema change message. The computer program product may further include code that performs the step of processing an inbound message to the application using an updated schema from a source application based on all applicable schema update messages having globally unique sequence identifiers up to and including a reference sequence number for the inbound message. The computer program product may further include code that performs the step of writing an outbound message from the application using an updated schema for messages from the application based on all applicable schema update messages having globally unique sequence identifiers up to and including a reference sequence number for the outbound message.

In an aspect, a computing system disclosed herein includes: an event stream; a sequencer that receives unsequenced messages from users of the event stream, arranges the unsequenced messages into sequenced messages having a global sequence in the event stream, and publishes the sequenced messages to the event stream; and an application coupled in a communicating relationship with the event stream and the sequencer, the application including a writer configured to publish one or more of the unsequenced messages, a reader to read the sequenced messages from the event stream, and a processing engine that sends a first message to the event stream containing a description of a schema that specifies a structure for data in one or more other messages published by the writer of the application.

Implementations may include one or more of the following features. The application may receive one or more of the sequenced messages from a second application coupled to the event stream, determine a second schema used by the second application based on schema information for the second application in the event stream, and process the sequenced messages from the second application according to the second schema. The application may be configured to change the schema to a second schema and to publish a schema update message to the event stream notifying other users of the event stream of the second schema.

In an aspect, a method disclosed herein includes: generating a first number of unsequenced messages with an application using a first schema identified by a first schema identifier; writing the first number of unsequenced messages to an event stream without globally unique sequence numbers for the event stream using a first data structure specified by the first schema; revising the first data structure to provide a second data structure specified by a second schema; writing a schema change message to the event stream with a second schema identifier that identifies the second schema; and, after receiving a sequenced version of the schema change message from a sequencer for the event stream, writing a second number of unsequenced messages to the event stream using the second data structure specified by the second schema.

Implementations may include one or more of the following features. Revising the first data structure may include revising the first data structure in response to an update in application logic for the application. Revising the first data structure may include revising the first data structure in response to a schema update received from schema management application coupled to the event stream. One of the first number of unsequenced messages may be generated by the application independently from messages received on the event stream. One of the first number of unsequenced messages may be generated by the application in response to a message received on the event stream, where the method further includes adding a reference sequence number to the one of the first number of unsequenced messages based on a globally unique sequence identifier for the message received on the event stream. The method may further include reading sequenced messages from the event stream, the sequenced messages having globally unique sequence numbers within the event stream, and processing the sequenced messages with the application.

In a processing system, an identifier for a current version of code for an application is published in a message to a shared event stream. Any instances of the application within the processing system may update to the current version before processing other messages having sequence numbers after the message containing the identifier. In this manner, multiple instances of the application may be periodically updated to maintain global consistency of the application and the shared event stream.

In an aspect, a method disclosed herein includes: reading sequenced messages from an event stream, the sequenced messages including globally unique sequence identifiers; writing unsequenced messages to the event stream from an application without globally unique sequence identifiers; in response to identifying one of the sequenced messages containing a second version number for the application different than a first version number corresponding to a current version of the application, retrieving a different version of the application corresponding to the second version number and replacing the current version of the application with the different version of the application; and processing one or more of the sequenced messages having a reference sequence number greater than or equal to the one of the globally unique sequence identifiers for the one of the sequenced messages containing the second version number using the different version of the application.

Implementations may include one or more of the following features. The globally unique sequence identifiers may be monotonically increasing numbers assigned by a sequencer for the event stream according to a time received by the sequencer. The method may further include adding a time stamp to each of the sequenced messages with the sequencer. The globally unique sequence identifiers may include monotonically increasing sequence numbers assigned according to an arrival at a sequencer. The method may further include, in response to the one of the sequenced messages containing the second version number, retrieving the different version of the application from a code repository. The method may further include, in response to the one of the sequenced messages containing the second version number, retrieving the different version of the application from the event stream. The method may further comprise including a corresponding one of the first version number or the second version number in each of the unsequenced messages from the application indicating a source application version associated with each of the unsequenced messages. The method may further include executing a plurality of instances of the application at a plurality of venues coupled in a communicating relationship with the event stream. The method may further include digitally signing each of the unsequenced messages before writing to the event stream. The method may further include filtering the sequenced messages to remove one or more of the sequenced messages from a local queue for the application. The application may process the sequenced messages with an order of execution determined by the globally unique sequence identifiers. The method may further include processing one of the sequenced messages having a reference identifier preceding a first globally unique sequence identifier of the sequenced messages containing the second version number with a version of the application corresponding to the first version number. The method may further include sequencing messages on the event stream by: reading unsequenced messages from the event stream, applying a time stamp to each of the unsequenced messages corresponding to a time received at a sequencer, arranging the unsequenced messages in a chronological order according to the time received at the sequencer, assigning monotonically increasing sequence numbers to the unsequenced messages according to the chronological order, and writing the unsequenced messages to the even stream using the monotonically increasing sequence numbers as the globally unique sequence identifiers. The method may further include processing an inbound message received by the application using an updated version of the application based on all revisions to the application up to and including any revisions corresponding to a reference sequence number for the inbound message. The method may further include processing an outbound message written from the application using an updated version of the application based on all revisions to the application up to and including any revisions corresponding to a reference sequence number for the outbound message.

In an aspect, a computer program product disclosed herein includes computer executable code embodied in a non-transitory computer readable medium that, when executing on one or more computing devices, updates application logic in a processing system by performing the steps of: reading sequenced messages from an event stream, the sequenced messages including sequence numbers; processing the sequenced messages with an application identified by a first version number; writing unsequenced messages from the application to the event stream without sequence numbers; in response to identifying one of the sequenced messages containing a second version number for the application, retrieving a different version of the application corresponding to the second version number and replacing the application with the different version of the application; and processing one or more of the sequenced messages having a reference sequence number greater than or equal to the one of the sequenced messages containing the second version number according to the different version of the application.

Implementations may include one or more of the following features. The computer program product may further include code that sequences messages on the event stream by performing the steps of: reading unsequenced messages from the event stream, applying a time stamp to each of the unsequenced messages corresponding to a time received at a sequencer, arranging the unsequenced messages in a chronological order according to the time received at the sequencer, assigning monotonically increasing sequence numbers to the unsequenced messages according to the chronological order, and writing the unsequenced messages to the event stream as sequenced messages using the monotonically increasing sequence numbers as the sequence numbers. The sequence numbers may be monotonically increasing numbers assigned by a sequencer for the event stream according to a time received by the sequencer, and each of the sequence numbers may be a globally unique sequence number within the event stream. The computer program product may further include code that performs the step of processing an inbound message received by the application using an updated version of the application based on all revisions to the application up to and including any revisions corresponding to a reference sequence number for the inbound message. The computer program product may further include code that performs the step of processing an outbound message written from the application using an updated version of the application based on all revisions to the application up to and including any revisions corresponding to a reference sequence number for the outbound message.

In an aspect, a computing system disclosed herein includes: an event stream; a sequencer that receives unsequenced messages from users of the event stream, arranges the unsequenced messages into sequenced messages having a global sequence in the event stream, and publishes the sequenced messages to the event stream; and an application coupled in a communicating relationship with the event stream and the sequencer, the application including a writer configured to publish one or more of the unsequenced messages, a reader to read one or more of the sequenced messages from the event stream, and a processing engine configured to process messages by at least one of processing one or more of the sequenced messages received on the event stream and creating one or more of the unsequenced messages for writing to the event stream, the application responsive to an update in the version by sending a second message to the event stream containing an updated version number for the application corresponding to an updated version of the processing engine.

Implementations may include one or more of the following features. The application may respond to the updated version number for the application received on the event stream by updating the processing engine of the application to the updated version. The application may be updated out-of-band from the event stream.

In an aspect, a computing system disclosed herein includes: an event stream; a sequencer that receives unsequenced messages from users of the event stream, arranges the unsequenced messages into sequenced messages having a global sequence in the event stream, and publishes the sequenced messages to the event stream; and an application coupled in a communicating relationship with the event stream and the sequencer, the application including a writer configured to publish one or more of the unsequenced messages, a reader to read one or more of the sequenced messages from the event stream, and a processing engine configured to process messages by at least one of processing one or more of the sequenced messages received on the event stream and creating one or more of the unsequenced messages for writing to the event stream, the application responsive to an update message received on the event stream and containing an updated version number for the processing engine by updating the processing engine to the updated version.

BRIEF DESCRIPTION OF THE DRAWINGS

The foregoing and other objects, features, and advantages of the devices, systems, and methods described herein will be apparent from the following description of particular embodiments thereof, as illustrated in the accompanying drawings. The drawings are not necessarily to scale, emphasis instead being placed upon illustrating the principles of the devices, systems, and methods described herein. In the drawings, like reference numerals generally identify corresponding elements.

DETAILED DESCRIPTION

Embodiments will now be described with reference to the accompanying figures. The foregoing may, however, be embodied in many different forms and should not be construed as limited to the illustrated embodiments set forth herein.

All documents mentioned herein are hereby incorporated by reference in their entirety. References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context. Thus, for example, the term "or" should generally be understood to mean "and/or."

Recitation of ranges of values herein are not intended to be limiting, referring instead individually to any and all values falling within the range, unless otherwise indicated herein, and each separate value within such a range is incorporated into the specification as if it were individually recited herein. The words "about," "approximately" or the like, when accompanying a numerical value, are to be construed as indicating a deviation as would be appreciated by one of ordinary skill in the art to operate satisfactorily for an intended purpose. Similarly, words of approximation such as "approximately" or "substantially" when used in reference to physical characteristics, should be understood to contemplate a range of deviations that would be appreciated by one of ordinary skill in the art to operate satisfactorily for a corresponding use, function, purpose, or the like. Ranges of values and/or numeric values are provided herein as examples only, and do not constitute a limitation on the scope of the described embodiments. Where ranges of values are provided, they are also intended to include each value within the range as if set forth individually, unless expressly stated to the contrary. The use of any and all examples, or exemplary language ("e.g.," "such as," or the like) provided herein, is intended merely to better illuminate the embodiments, and does not pose a limitation on the scope of the embodiments. No language in the specification should be construed as indicating any unclaimed element as essential to the practice of the embodiments.

In the following description, it is understood that terms such as "first," "second," "top," "bottom," "up," "down," and the like, are words of convenience and are not to be construed as limiting terms unless specifically stated to the contrary.

Figure 1:
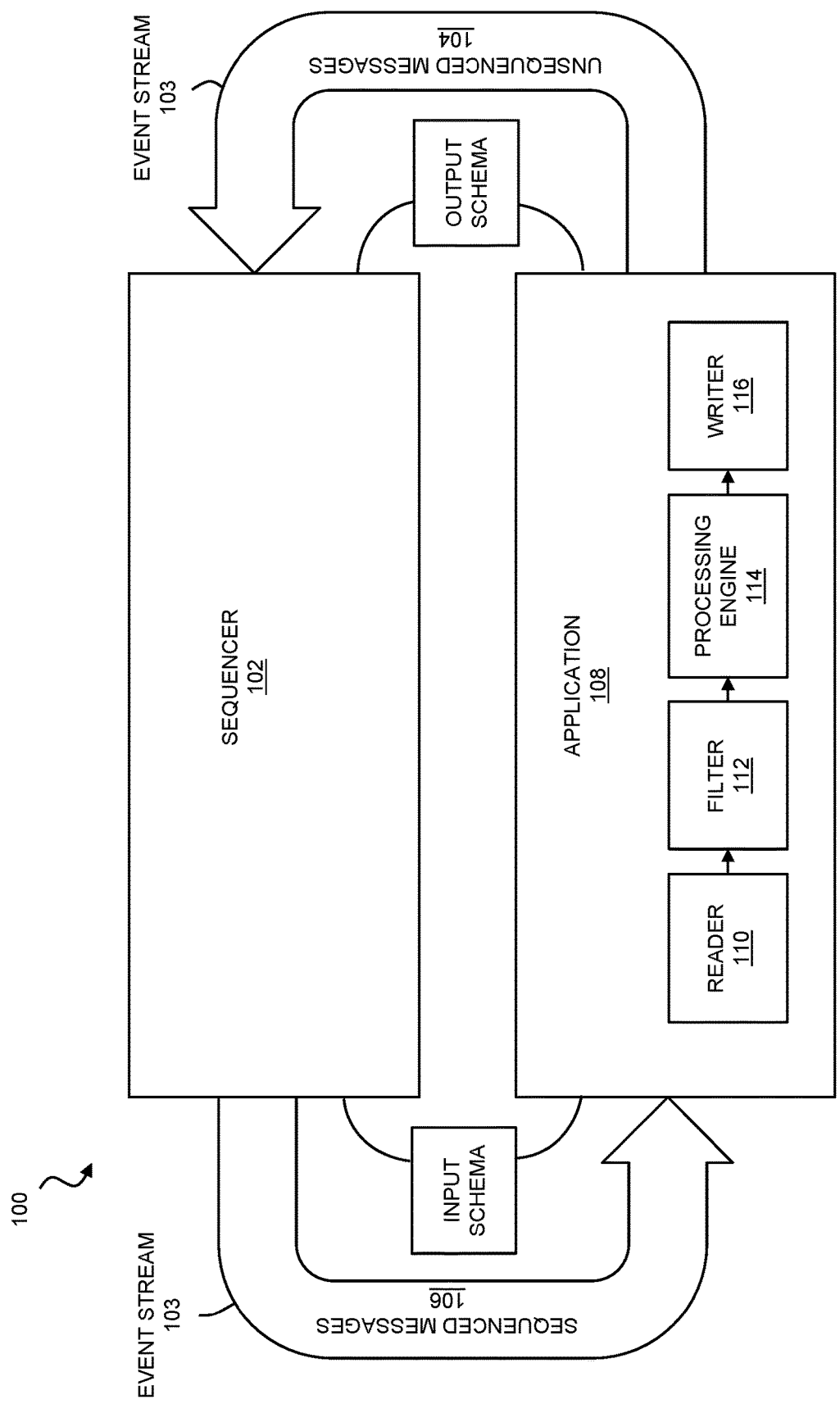
FIG. 1 shows a sequencer and an application using an event stream.

FIG. 1 shows a sequencer and an application using an event stream. In general, the system 100 may include a sequencer 102 that sequences messages in an event stream 103, more specifically by receiving an unsequenced stream of messages 104 and publishing a corresponding sequenced stream of messages 106. The system 100 may also include an application 108 containing a reader 110 that receives the sequenced stream of messages 106, a filter 112, a processing engine 114, and a writer 116 that publishes messages to the unsequenced stream of messages 104. While the system 100 may be used in a distributed computing environment, e.g., where a number of applications are separated from the event stream 103, e.g., by a gateway or the like, the system 100 may also or instead include a locally distributed computing environment where a number of applications locally access the event stream 103 from one or more computing platforms, or a local computing system where the applications are all interconnected locally by a single physical communications infrastructure. Regardless of the architecture or scale of the system 100, the sequencer 102 generally operates to provide a globally consistent event stream 103 as described herein.

The sequencer 102 may receive messages from users of the event stream 103 or any other source(s), e.g., in an unsequenced stream of messages 104 (also referred to herein as "unsequenced messages 104") and may arrange the unsequenced messages into sequenced messages having a global sequence (using globally unique sequence identifiers assigned by the sequencer 102) within the event stream 103. The sequencer 102 may publish these sequenced messages to the event stream 103 as a sequenced stream of messages 106 (also referred to herein as "sequence messages 106") for consumption by other users. Thus, in one aspect, the sequencer 102 helps to ensure that the event stream 103 provides a globally consistent view of messages among all applications within the system 100, including the chronological order thereof. While messages in the unsequenced stream of messages 104 may arrive at different times (relative to when they were created by applications), and sequenced messages 104 may arrive at different times at each application when published to the event stream 103 by the sequencer 102, the sequencer 102 can ensure that all applications agree on a chronological ordering of messages relative to one another with reference to a specific time source. As generally used herein, a 'message' refers to any tangible record transmitted or processed within the event stream 103 of the system 100, and an 'event' refers to the content of a message, e.g., the occurrence, instruction, observation, analysis, or the like described by the contents of one of the messages. However, these terms are also occasionally used interchangeably to refer more generally to data in the event stream 103, and both meanings may be intended unless a more specific meaning is provided or otherwise clear from the context.

In operation, when the sequencer 102 receives a message in the unsequenced stream of messages 104, the sequencer 102 may determine an arrival time of the message and may place a time stamp on each arriving message. The sequencer 102 may then place each message in a chronological order with a number of other messages in the unsequenced stream of messages 104 according to a time of arrival at the sequencer 102. In another aspect, the messages may be ordered based in part on a time stamp from a source application or some other intermediate resource, e.g., where there is an alternative time source that provides a suitably synchronized, reliable and/or verifiable time. The sequencer 102 may also or instead use some combination of these, e.g., by relying on an external, cryptographically verifiable time stamp in an arriving, unsequenced message where such a time stamp is present, and providing a time stamp upon arrival where such a time stamp is not provided in the arriving message.

Once the messages are placed in a global chronological order (e.g., relative to other messages received at the sequencer 102), the sequencer 102 may assign a monotonically increasing sequence number or some other globally unique identifier to each message signifying the message's global chronological order. Among other advantages, this enables detection of lost packets in the sequenced stream of messages 106 published by the sequencer 102 because receivers such as the application 108 can examine the sequence numbers for any unexpected gaps. Once marked in this manner, the messages may be committed to the system 100 and forwarded to applications via the event stream 103. The sequencer 102 may also locally store any window of sequenced messages. In another aspect, a logging device or the like may log some or all of the messages in the event stream 103 for subsequent audit, troubleshooting, recovery and so forth.

In general, messages may be forwarded from the sequencer 102 to all applications in parallel using a fan-out or one-to-many pattern. For example, the event stream 103 may employ User Datagram Protocol (UDP) multicast network communications, along with repeaters to support fast reliable messaging, as described for example in commonly-owned U.S. Pat. No. 9,547,565, incorporated herein by reference. By sequencing messages with globally unique sequence numbers and providing repeaters to replay dropped, sequential packets, each message in the sequenced stream of messages 106 may be reliably delivered using the (otherwise inherently unreliable) UDP multicast protocol. Because the sequencer 102 performs only the narrow task of time ordering messages, it can operate with extreme speed, accommodating a very high message throughput with low latency. When coupled with fast and reliable messaging (e.g., using the event stream 103 described below), this architecture advantageously supports massive scaling in which many independent applications can run in parallel while sharing a consistent global state.

The event stream 103 may generally include any sequence of messages, objects, or other data elements or the like that are made available over time. In the context of this disclosure, the event stream 103 may also include any hardware and/or software that supports the creation, storage, and communication of messages on the event stream 103, including without limitation, any corresponding communications infrastructure, network interfaces, and hardware/software or the like to enable publishing, logging, and/or reading of messages associated with the event stream 103.

It will be understood that the unsequenced stream of messages 104 in the event stream 103 are depicted as separate from the sequenced stream of messages 106 in the event stream 103 in order to distinguish the globally sequenced messages 106 that are published by the sequencer 102 from the unsequenced messages 104 that are published by users such as the application 108. However, this separation is not required. The unsequenced stream of messages 104 and the sequenced stream of messages 106 may use the same communications infrastructure, or similar or identical but parallel communications infrastructures, without departing from the scope of this disclosure. Thus, in one aspect, the unsequenced stream of messages 104 may use same communications infrastructure that carries the globally sequenced messages from the sequencer 102, or a different infrastructure, or some combination of these. Similarly, while a single logical or physical event stream 103 may carry both unsequenced messages 104 and sequenced messages 106, these two message streams may also or instead be logically and/or physically separated. Thus, for example, in one aspect, the event stream 103 may consist exclusively of sequenced messages 106 that have been ordered by the sequencer 102 and a second message stream may provide a medium for unsequenced messages. Thus, while the term "event stream" is generally used herein to refer to streams of both sequenced and unsequenced messages, the communications medium may also or instead be configured as or described as an "event stream" of sequenced messages and a "second event stream" or "message stream" of unsequenced messages, all without departing from the scope of this disclosure.

The sequencer 102 and event stream 103 generally cooperate to provide a messaging bus for a time-ordered data processing system at high capacity, high availability, and with low latency, and the resulting event stream 103 may serve as the information backbone of the system 100. In this context, the event stream 103, or more specifically, the sequenced stream of messages 106 in the event stream 103, may generally serve as a master sequenced stream of messages reflecting any changes or updates in data within the system 100, including internal message traffic among applications, alert to external resources, and so forth. The event stream 103 may also synchronize a global state for all internal (and external) applications, with each consuming from and contributing to the shared event stream 103 while independently performing any local processing functions. The event stream 103 may also provide a sequenced audit trail of all sequenced messages in the operating history of the event stream 103 (or some chronological or topical subset thereof) to facilitate subsequent audit, troubleshooting, compliance, analysis, and so forth.

In one aspect, the sequencer 102 may be implemented using the same architecture and resources used for the application 108 as described below. That is, the sequencer 102 may use a reader to receive messages from the event stream 103 and a writer to publish events to the event stream 103. Thus, while illustrated as separate from an application 108, the sequencer 102 may be implemented in the same manner as other applications in the system 100, with the particular, narrow function of ordering and numbering messages in the event stream 103. Additionally, multiple instances of the sequencer 102 may be executed concurrently, provided there is a mechanism for globally synchronizing messages for all instances, such as the technique described in commonly-owned U.S. Pat. No. 10,678,694 issued on Jun. 9, 2020, incorporated herein by reference in its entirety. In one aspect, the sequencer 102 may usefully be positioned at a central communications point within a logical network infrastructure such as a switch or gateway that carries traffic for the event stream 103 and/or other applications in the system 100.

The event stream 103 and sequencer 102, as described herein, can provide many advantages. UDP multicast can be used to efficiently fan messages out to a large audience in a single communication, albeit without inherently providing reliable delivery. At the same time, the unique and monotonically increasing message numbers from the sequencer 102 permit each listener to confirm that all messages have been received. The resulting sequenced stream of messages 106 helps to ensure that all users (such as the application 108) arrive at the same global state, with messages recorded in a chronological order, e.g., based on the time of arrival at the sequencer 102. At the same time, the event stream 103 may support historical playback, e.g., for audit, reconstruction of historical messages, and so forth, or to permit new applications coupling to the event stream 103 to synch to the current global state as needed. The individual users of the stream, such as the application 108 can be independently implemented in any desired fashion, with each application programmable to make autonomous decisions about what information to read from the event stream 103, what functions to perform, how to perform them, and what to publish to the event stream 103.

It will be appreciated that, while the system 100 may advantageously use a UDP multicast of sequenced messages as the foundation of a messaging bus, other techniques may also or instead be employed. For example, a wide variety of message stream processing and other message-driven systems and architectures are available for processing time-based data and may be adapted for use as a messaging architecture with the systems and methods described herein, provided they meet the performance requirements of any intended use and context for the system 100.

The application 108 may be coupled in a communicating relationship with the event stream 103 and the sequencer 102 as described herein. The application 108 generally operates as a compute engine within the system 100 and may perform any of a variety of specific roles including, e.g., a client gateway, a transaction engine, an external monitor, a database writer, a sequencer (as discussed above), and so forth. While a single application 108 is illustrated for simplicity, it will be understood that the system 100 may include any number of similarly configured applications, each performing any number of different functions that, in the aggregate, provide the functionality of the system 100. Additionally, two or more instances of the application 108 may execute in parallel using different data, or redundantly using the same data, e.g., to support distributed computing and/or parallel processing as desired.

The application 108 may include a writer 116 configured to publish one or more of the unsequenced stream of messages 104 to the event stream 103, a reader 110 to read the sequenced stream of messages 106 from the event stream 103, and a processing engine 114 that processes messages from the sequenced stream of messages 106. Some or all of the applications within the system 100 may adopt this common input and output architecture and may more generally adopt a common framework of internal components. One notable exception is the sequencer 102, which will generally read unsequenced messages and write sequenced messages.

In one aspect, the application 108 may be configured to synchronize code updates using the event stream 103. While a single instance of an application may readily be updated using any suitable local technique, the event stream 103 may advantageously facilitate a synchronized update to multiple instances of the application 108 that are geographically or computationally distributed. For example, the processing engine 114 may be configured to respond to a version number identifying a version update for the application 108 received in one of the messages on the event stream 103 by retrieving the version update from a remote resource and updating the application 108 according to the version update. The version update may be a partial update of the application 108 such as an update to the reader 110, the filter 112, the processing engine 114, or the writer 116, or one or more computational components of any of the foregoing. The processing engine 114 may also respond to multiple, consecutive version numbers for multiple consecutive updates with a corresponding series of updates to the application. While the update may be initiated using a message on the event stream 103, it will be understood that an update may also or instead be initiated in a local programming environment of the application 108, e.g., through any corresponding programming interface or the like. In this case, the application 108 may, after a successful update, write an update message and/or a new version number to the event stream 103 to alert other applications to the change. The application 108 may also use the sequenced version of such a message from the sequencer 102 as an initial check on a successful completion of the update.

The manner in which an update is performed will depend upon the computing context in which applications are executed. The update may be performed, e.g., by communicating new executable code segments or libraries using the event stream 103, or by using reflection methods or the like to modify the structure or behavior of the code. More generally, any techniques for updating code, e.g., for a number of distributed instances of an application 108, may be used to update code as described herein, depending, for example, on the programming language, programming environment, physical or virtual machine environment, and so forth. In general, any suitable technique for enforcing permissions, controlling access, authenticating identity, and/or credentialing or otherwise authorizing users of the application 108 may be used to control whether and how updates are authorized.

A reader 110 of the application 108 may receive committed, e.g., sequenced, messages on the event stream 103, such as UDP multicast messages with globally unique, sequential numbers or other globally unique identifiers as described herein. Each application in the system 100 will receive the same stream of sequenced messages. The reader 110 may detect out-of-sequence messages and may recover messages as needed based on gaps in sequence numbers, e.g., using a repeater or other messaging infrastructure that supports reliable messaging. The reader 110 may also check that unsequenced messages from the application 108 are being received and sequenced by the sequencer 102 by checking for a return of sequenced (e.g., globally numbered) instances of messages generated by the writer 116 of the application. In another aspect, this messaging integrity function may be performed by the processing engine 114 or some other component of the application 108. The reader 110 may also, under certain circumstances, playback from historically recorded streams to simulate how new logic processors would behave on previous production traffic, e.g., before changing or updating the processing engine 114.

A filter 112 may optionally be included in the application 108 that determines which message(s) the processing engine 114 requires from the event stream 103 as input. The filter 112 may usefully remove any unwanted or unneeded messages, and only forward certain non-filtered messages to the processing engine 114 for processing according to the function of the application 108.

The processing engine 114 of the application 108 applies rules, functions, programming logic and the like to process messages received from the event stream 103, and to create new messages for publication to the unsequenced stream of messages 104. The processing engine 114 may include any suitable code, using any suitable coding language, platform, or environment, to implement desired user functions, and may generally function to support any desired (e.g., user configured) role(s) of the application 108 within the system 100. For example, the processing engine 114 may support a transaction engine, a monitoring system, an alert/notification platform, or any combination of these.

The writer 116 may generally manage outbound communications to the system 100, e.g., by creating and transmitting unsequenced messages to a messaging medium such as the event stream 103 for communication to the sequencer 102. While this may include any messages output by the processing engine 114 and consistent with operation of the application 108, the writer 116 may also or instead publish a number of writer-specific message types to support operation of the system 100, e.g., to manage connectivity, manage schema usage, and so forth. It will be understood that in this context, "unsequenced messages" refers to messages that have not received a globally unique sequence identifier from the sequencer 102. It may be useful in some deployments for the application 108 and/or the writer 116 to create local sequence numbers and append them to messages from the application 108. Although such messages might contain sequence numbers, these messages are not "sequenced messages" as described herein unless/until they receive globally unique sequence identifiers from the sequencer.

In one aspect, the writer 116 may employ a RESEND protocol to ensure reliability. The application 108 will generally expect to see its own messages published to the event stream 103 as sequenced messages once they have been received and ordered by the sequencer 102. If a message is not returned after a predetermined interval such as a time-out period, the writer 116 may resend the message in order to ensure that it is included in the global state maintained by the event stream 103. The time-out period may be variably controlled by the processing engine 114 or controlled by the sequencer 102 or otherwise enforced globally for the system 100, or some combination of these.

The writer 116 may also employ a throttling mechanism to ensure that the application 108 does not crowd out other users of the messaging bus and the sequencer 102. For example, the writer 116 may employ an N-in-Flight throttling mechanism to enforce an upper bound (N) on the number of messages that can be sent to the sequencer 102 without receiving an explicit acknowledgment in the form of a "sequenced" message. Messages beyond the bound (N) are queued at the writer 116 until one or more other messages from the application 108 are sequenced and received by the application 108. This approach ensures fair access to the sequencer 102 among multiple applications and prevents denial-of-service attacks or other similarly orchestrated malicious activity. As with the time-out period, the upper bound for outstanding messages may be variably controlled by the processing engine 114 or controlled by the sequencer 102 or otherwise enforced globally for the system 100, or some combination of these. Thus, for example, different time-out limits may be used by different applications, and/or at different times during the day or week.

In one aspect, the writer 116 may send a message containing a description of a schema used by the writer 106 to publish data. This schema may specify a structure for data in messages published by the writer 116 and may be used by other applications connected to the system 100 in order to decode and interpret messages from the application 108, or to format messages for communication to the application 108. The schema may periodically change, e.g., by a user or administrator of the application 108, and the new schema may be published to the stream of unsequenced stream of messages 104 prior to messages from the application 108 using the new schema. In this manner, the application 108 may flexibly and periodically revise the schema as necessary or helpful for operation of the application 108. For example, the schema may change when the processing engine 114 is changed or updated, or when the processing engine 114 wishes to provide additional information, or otherwise change the type and/or amount of data shared in messages on the event stream 103, or when the application 108 would like to receive additional or different information from other applications. The overall architecture is intended to be flexible, and schema changes may arise in a variety of contexts such as changes in the data environment for the application 108, changes in the purpose or function of the application 108, changes in the performance or capabilities of the application 108, and so forth. Under any of these or other circumstances, the processing engine 114 may provide a new schema for messages, and the new schema may be shared with other applications through the event stream 103.

Any messages sequenced by the sequencer 102 from the application 108 after the schema revision message can be interpreted by other applications according to the new schema. The sequencer 102 facilitates this process by ensuring that any messages from the application 108 created after processing (e.g., sequencing) the schema update message will have a reference sequence number greater or equal to the schema update message. Thus, the schema update message may be accurately chronologically placed among other messages from the application 108 by the sequencer 102. The processing engine 114 (and or writer 116) may continue to update the schema, e.g., by subsequently publishing additional messages each including a revision to the schema used by the application 108. It will be understood that, while management of the schema versions is generally attributed in this description to the writer 116, this versioning may also or instead be managed by the processing engine 114, which may provide schema update information for the writer 116 to publish as appropriate. Thus, a message containing a description of a schema that specifies a structure for data in one or more other ones of the messages may be sent or published by the processing engine 114 to the writer 116, from the writer 116 to the stream of unsequenced stream of messages 104, or some combination of these. In another aspect, schemas may be managed by a separate, dedicated application that issues schema updates for other applications, either independently or in response to requests from the applications (or some combination of these).

Figure 2:
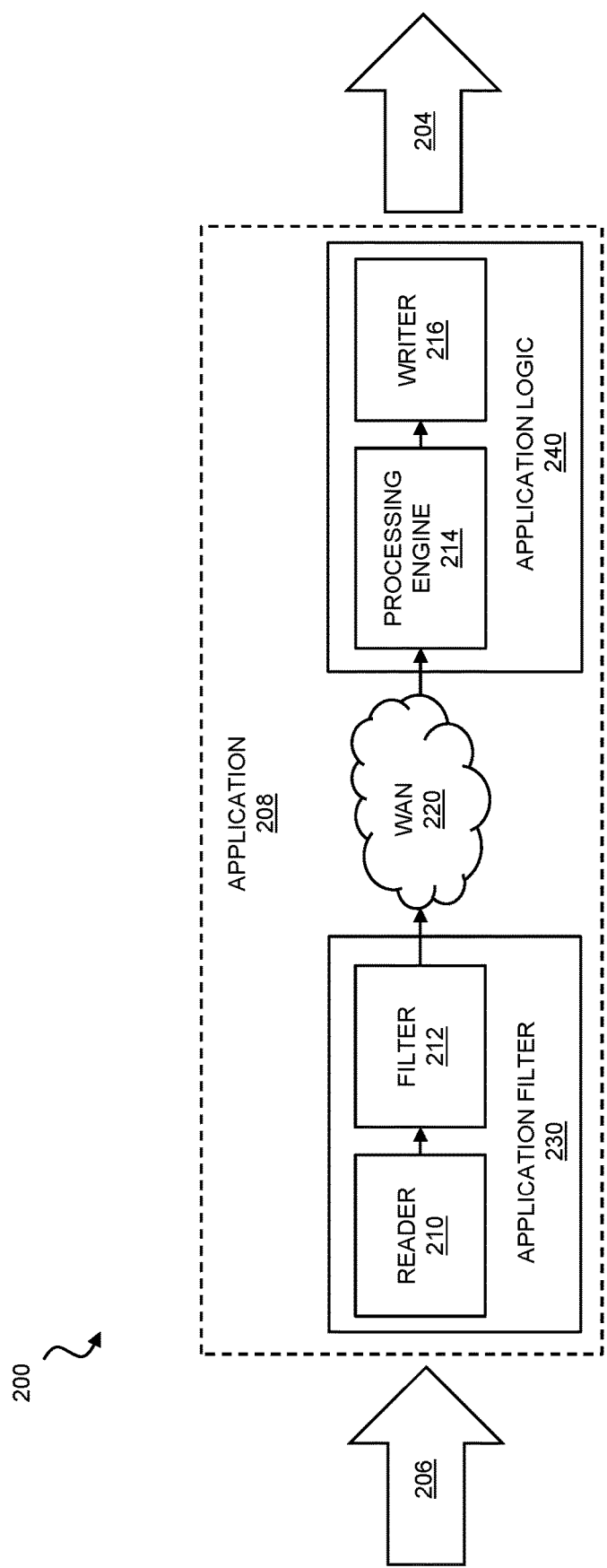
FIG. 2 shows a cloud implementation of an application.

FIG. 2 shows a cloud implementation of an application. In general, the components of the application 108 described above may be distributed in a cloud environment in any number of ways, with separate functions performed at different locations and/or with different computing resources, deployments, or the like. For example, as depicted in FIG. 2, the system 200 may include an application 208 that receives a sequenced stream of messages 206 with a reader 210, filters the messages with a filter 212, processes the messages (and/or other data) with a processing engine 214, and writes messages to the unsequenced stream of messages 204 with a writer 216, all as generally described above. These components may individually be located in separate network locations according to, e.g., a location of application users, co-location of certain applications, adjacency to resources such as transaction engines, databases and the like, adjacency to shared parallel processing resources, and so forth.

In the embodiment of FIG. 2, the reader 210 and the filter 212 (collectively, an application filter 230) may be deployed separately from the processing engine 214 and the writer 216 (collectively, application logic 240). More specifically, the application filter 230 may be coupled to the application logic 240 through a wide area network 220 such as the Internet, or any other public internetwork, private internetwork, or combination of these. Since applications process a subset of a global event stream 103, message reading and filtering can be deployed natively on a multicast group used by the sequencer 102, and application logic 240 including the processing engine 214 can be deployed remotely, e.g., on a remote cloud computing platform or the like, or on a number of other data centers and cloud computing resources in parallel. This arrangement permits individual users of the system 200 in general, and the event stream 103 in particular, to employ any desired technology platform(s) for, e.g., database storage, messaging, processing, and so forth, and to independently design (and price) features such as compute resources and storage. By placing the filter 212 on the source side of a message stream, the traffic carried by the wide area network 220 can also advantageously be reduced, thus reducing potentially harmful network effects (e.g., bandwidth limitations, latency) of network components 220 that are external to the event stream architecture.

Figure 3:
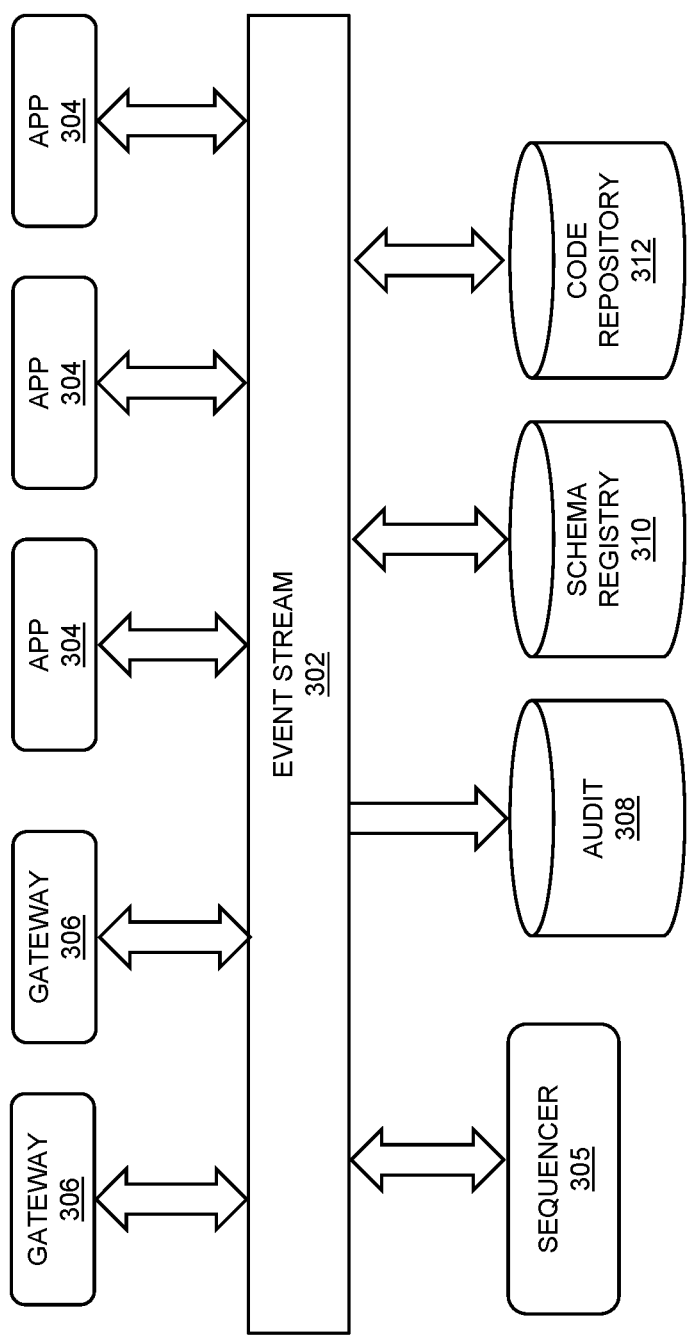
FIG. 3 shows a computing system using an event stream as a messaging bus.

FIG. 3 shows a computing system using an event stream 302 as a messaging bus. In general, the system 300 may include an event stream 302 and one or more applications 304 such as those described herein. As described above, the event stream 302 may provide a consistent, global view of the context (e.g., the history of messages communicated among users of the event stream 302) in which the applications 304 operate. It will be understood that, while the event stream 302 is depicted as a single communication medium, the system 300 may use two different messaging mediums for the unsequenced messages sourced from individual applications 304 and the sequenced messages containing globally unique sequence identifiers added by the sequencer 305. In general, each application 304 may operate independently to read from and write to the event stream 302, which serves as a messaging bus among the applications 304 and other resources.

For example, a first application 304 may send a first message containing a schema that specifies a data structure used to communicate information. A second application 304 may receive the message and may use the message to interpret subsequent messages from the first application 304. More specifically, the second application 304 may receive a second message occurring after the first message in a chronological order based on arrival time at the sequencer 305 (which applies sequence numbers accordingly) and may process the second message from the first application 304 using the schema specified in the first message.

Each gateway 306 may couple the network supporting the event stream 302 to one or more other networks or remote resources. This may, for example, include connections to the Internet, as well as connections to campus or corporate networks and other non-public computing venues that host users of the event stream 302. Although not depicted, the system 300 may also include any number of additional applications 304 coupled to the event stream 302 through the gateways 306 or coupled to parallel instances of the event stream 302 that are in turn coupled to the event stream 302 through the gateways 306. Thus, the system 300 may include any number of applications 304 executing in any number of venues. This may also include executing a plurality of instances of a single application at a number of geographically distributed, local venues that are all coupled in a communicating relationship with the event stream 302, e.g., through one or more of the gateways 306. In this manner, multiple, distributed, concurrent instances of a single application may be executed, e.g., to provide computationally and/or geographically distributed access to a resource such as a transaction engine (e.g., for a trading floor or an online marketplace) shared by one or more of the applications 304.

The system 300 may include an audit log 308 or other similar repository that retains any desired history of messages on the event stream 302. In general, the audit log 308 will receive messages from, but not write messages to, the event stream 302, which may advantageously isolate the audit log 308 from bi-directional access by users of the event stream 302 and help to ensure the integrity of data contained therein. The audit log 308 may generally facilitate review and investigation of historical operations in the system 300 and may be deployed as a database or other data repository that supports queries and the like for reviewing historical activity out-of-band from the event stream 302.

The system 300 may optionally include a schema registry 310. This may provide a searchable archive of schemas used by applications 304 that communicate using the event stream 302. The schema registry 310 provides a convenient mechanism for determining schemas of other applications 304, e.g., when a new application 304 couples to the event stream 302. In another aspect, this permits applications using large, complex schemas to store a new schema in the schema registry 310 and communicate the schema to other applications using a pointer or the like to the schema registry 310. It will be appreciated that the system 300 may instead omit the schema registry 310 and may rely exclusively on the event stream 302 as an archive of application schemas that is accessible to all applications 304 using the system 300.

The system 300 may also or instead include a code repository. This may include a local code repository or a global code repository (such as GitHub or the like), which may serve as a remote resource for storing code updates in a manner accessible to the event stream 302. The code repository 312 may be responsive to a request from one of the applications 304 for a version update by placing the version update on the event stream 302, or by otherwise making the code available for use in an update of the application 304. In another aspect, the code repository 312 may be out-of-band from the event stream 302 and made available to users of the event stream 302 as necessary or helpful through other local or wide area network pathways.

Figure 4:
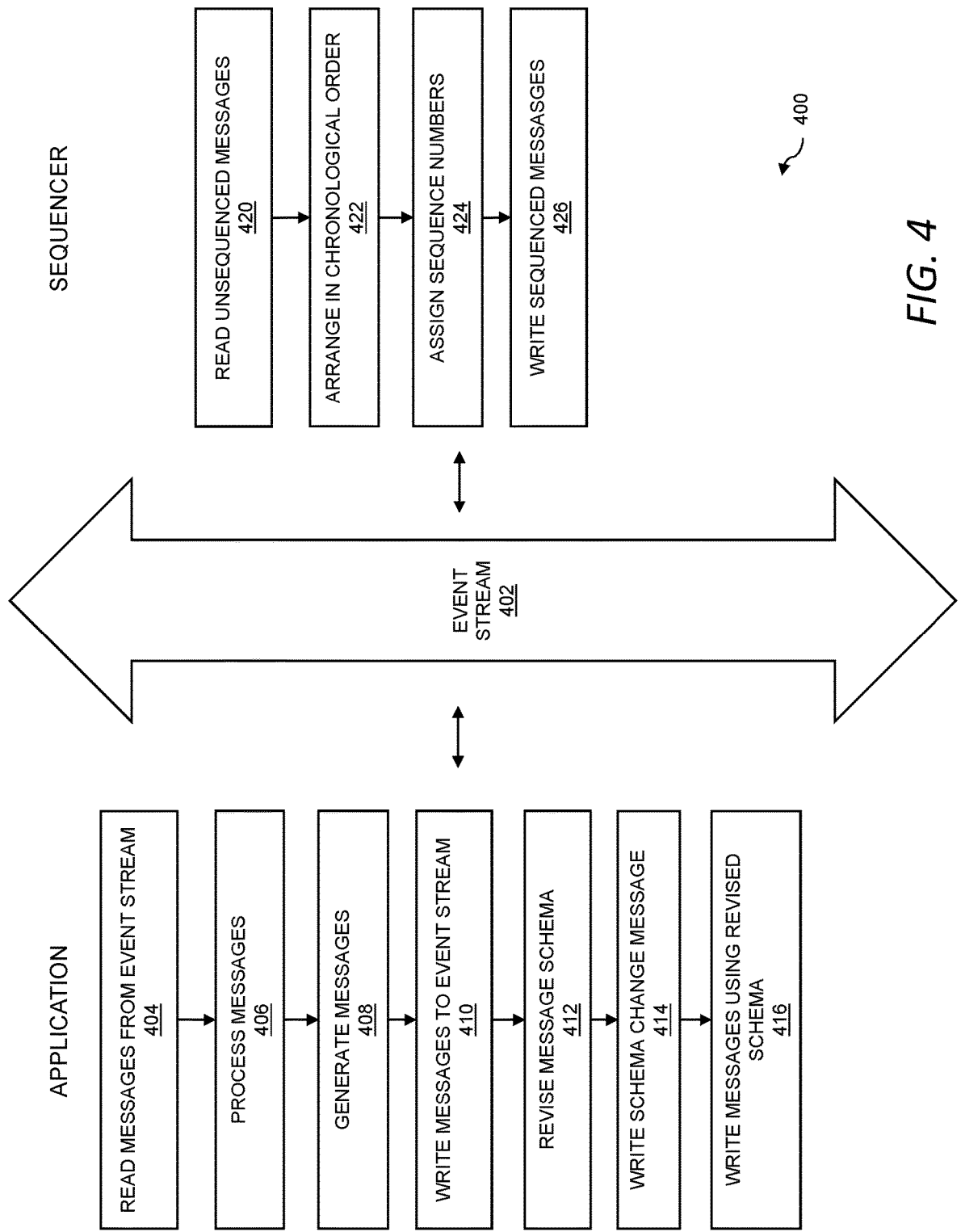
FIG. 4 shows a method for managing schemas on an event stream.

FIG. 4 shows a method for managing schemas on an event stream. In general, an application connected to an event stream may publish a schema for the structure of data payloads contained in messages from the application. Other applications within the system can receive the schema and apply the schema to subsequent messages from the originating application. The application may from time to time dynamically update the schema and publish a revised schema for use by the other applications connected to the event stream for subsequent messages. In general, applications may manage schemas using the event stream 402 as a messaging bus as described below. While the following description emphasizes schemas used by applications to write messages, it will be understood that applications may also or instead use schemas to describe the data structure for other applications to use when sending data to the application. If both inbound and outbound schemas are employed, the method 400 may also include suitable adaptations for reconciling whether (and when) a writer versus a reader establishes the schema for a particular inter-application communication.

As shown in step 404, the method 400 may begin with the application reading sequenced messages from the event stream 402, where each of the sequenced messages includes a sequence number such as the globally unique sequence numbers described herein. These may, for example, include monotonically increasing numbers assigned by the sequencer according to time stamps for the time of arrival of unsequenced messages at the sequencer from a plurality of writers (of applications) to the event stream 402. Each sequence number may be a globally unique sequence number or other globally unique identifier within the event stream 402 in order to ensure a globally consistent view of messages within a system using the event stream 402. As described above, reading sequenced messages may also include filtering the sequenced messages to remove one or more of the sequenced messages from a local queue for the application. This may include, e.g., filtering based on source, time, size, sequence number, message type, content, and/or any other criteria applicable to sequenced messages.

Each sequenced message may also include a reference sequence number that identifies a second one of the globally unique sequence identifiers (preceding the sequence number for the message) for another sequenced message that triggered the sequenced message from a source application. In certain edge cases, e.g., where the source application is responding to an external sensor or stimulus, the source application may use a temporal proxy for a reference sequence number such as one of the globally unique sequence identifiers that the source application is currently processing or a most recent globally unique sequence identifier in a reader queue for the source application.

As shown in step 406 the method 400 may include processing the sequenced messages with the application, e.g., with a processing engine of the application. This may include decoding messages from other applications using schemas previously published by those applications to the event stream. This may also or instead include processing the sequenced messages with an order of execution determined by the sequence numbers. It will be understood that some applications may perform functions such as external monitoring that are independent of the event stream 402, and thus in some instances an application may operate without reading any messages from the event stream 402, while still writing periodically to the event stream, e.g., in response to events locally detected by the application. In one aspect, such an application may nonetheless read messages on the event stream 402, e.g., to confirm that the application's published messages have been sequenced and committed, or to obtain reference sequence numbers for outbound messages as described above.

As shown in step 408, the method may include generating messages responsive to the sequenced messages received on the event stream 402. This may result, for example, in a number of unsequenced messages responsive to the sequenced messages, each containing a reference sequence number that identifies (by corresponding globally unique sequence identifier) an inbound, sequenced message that triggered a corresponding one of the unsequenced messages. In general, the application may generate these messages using a first schema identified by a first schema identifier, e.g., that specifies the schema being used by the application. The schema identifier may be placed onto the event stream 402 in a separate schema update message, or the schema identifier may be included in each message generated by the application using the schema. As noted above, while the processing engine may generate output messages that are specifically responsive to received messages, the processing engine of an application may also or instead generate output messages independent of other data on the event stream 402. This may, for example, included messages responsive to sensor data locally received by the application, user input locally received through a user interface at a console for the application, time-based data that is periodically generated by the application, and so forth. In these cases, the reference sequence number may, for example, include a globally unique sequence identifier for a message currently being processed by the application.

In one aspect, the schema identifier may be the schema itself, or any other complete description of the data structure specified by the schema. Thus, the application may identify the schema by simply writing the structure of the schema to the event stream with each message. In another aspect, the schema identifier may be a name, numerical identifier or other identifier that specifies the schema and/or provides a pointer to a location where the schema can be retrieved. While the schema identifier provides a useful way to uniquely and robustly identify an appropriate schema to applications that receive the corresponding messages, the global consistency provided by the event stream 402 also makes it possible to update schemas without explicitly providing schema identification numbers. For example, when another application receives a message from the application, the receiving application may simply go sequentially backward in the event stream 402 until a schema description from the application is found. It will also be understood that the use of schema identifiers permits an application to dynamically interchange a number of different schemas, such as where the application switches back and forth among different message types according to message content, message context, intended recipients, and so forth.

As shown in step 410, the method 400 may include writing the first number of unsequenced messages to the event stream using a first data structure specified by the first schema. The unsequenced messages will typically be without any globally unique sequence numbers uniquely identifying such messages. However, these messages may include globally unique sequence numbers from other messages received at the application, which may be used as reference sequence numbers as described herein. These messages may also usefully be locally sequenced by an application and/or writer, e.g., so that an order of messages from a particular writer can be subsequently determined. In order to clarify these various pieces of sequence-identifying information, the term "unsequenced," as used herein describes a message (or stream of messages) without a globally unique sequence identifier assigned by the sequencer. Such an unsequenced message may nonetheless include other sequence numbers indicating temporal order such as numbers locally assigned by an application using the event stream 402, or reference sequence numbers obtained from other sequence messages on the event stream 402. Similarly, the term "sequenced," is used herein to describe a message having a globally unique sequence identifier assigned to the message by the sequencer.

As shown in step 412, the method 400 may include revising the data structure used for the messages, thus providing a second data structure specified by a second schema. This may be, e.g., where the application is changing between two or more alternative schemas that are used serially or intermittently. In another aspect, this may occur when the processing engine is updated, or more generally, when it is necessary or helpful for an application to change the structure used to communicate messages on the event stream 402. In general, this may include completely replacing an existing schema and/or incrementally modifying an existing schema, e.g., by changing a data type, adding an attribute, removing an attribute, modifying default values, and so forth.

As shown in step 414, the method 400 may include writing a schema change message to the event stream with a second schema identifier that identifies the second schema. It will be appreciated that, in complementary fashion, the method 400 may include receiving a schema change message from another application (with one of the sequence numbers) on the event stream 402 and applying a corresponding schema to a sequenced message from the second application having a reference sequence number greater than or equal to the one of the sequence numbers for the second schema change message. The 'equal to' range boundary here specifically contemplates a case in which the schema change message itself triggers the next sequenced message from the second application. In this context, the application may process the sequenced messages having a reference sequence number less than the sequence number of the schema change message with the first schema (e.g., the prior schema) and may process sequenced messages having a reference sequence number greater than (or equal to) the sequence number of the schema change message with the second schema (e.g., the updated schema). More generally, it will be understood that the schema management techniques may be used by applications to publish new schemas from the application, and in similar fashion, to receive schema updates from other applications.

It will be appreciated that a new schema may be used generally by readers and writers within the system. In certain cases, e.g., where the schema adds a new variable or attribute, and a writer with pre-update code does not recognize or provide information for that field, the schema may usefully specify a default value to permit the application logic for the writer to communicate using the updated schema. The default values may, for example, be included in the schema definition or schema update message for use as needed by applications using the event stream. It will also be appreciated that, while a schema for application output is generally described above, the same techniques may readily be adapted to permit an application to specify formats in which it expects to receive data.

As shown in step 416, the method 400 may include, after writing the schema change message to the event stream 402 (or concurrently with writing the schema change message to the event stream 402), writing unsequenced messages to the event stream 402 using the second data structure specified by the second schema, e.g., using a writer for the application. In order to maintain schema consistency across users of the event stream 402, the application may wait for the schema change message to return to the application from the sequencer as a sequenced message. In one aspect, messages may include a corresponding schema identifier so that receiving applications can accurately identify the appropriate schema. In another aspect, a receiving application may apply a particular schema to any messages having a reference sequence number greater than or equal to the sequence number for the schema change message. Each message received from sequencer on the event stream 402 may also include, e.g., a time stamp from the sequencer that places a schema update at a particular point in time (with reference to an associated clock), and or a digital signature from the sequencer and/or the source application for purposes of verification.

Concurrently with operation of the application as described above, a sequencer may operate to sequence messages and publish them to the event stream 402 as generally described herein. For example, this may include reading unsequenced messages from the event stream 402 as shown in step 420, generating time stamps for the time of arrival of each message, arranging the unsequenced messages in a chronological order of arrival, e.g., according to the time stamps, as shown in step 422, assigning monotonically increasing sequence numbers (or other globally unique sequence identifiers) to the unsequenced messages according to the chronological order as shown in step 424, and writing these messages with the monotonically increasing sequence numbers to the event stream 402 as sequenced messages as shown in step 426. In this context, it will be understood that the term "sequenced" refers to messages having globally unique sequence identifiers within the event stream 402. It is additionally possible that each application may assign sequence numbers to outbound messages for other purposes, however these messages are not "sequenced" within the context of the event stream 402 because the sequencer does not generally ensure that these writer-assigned sequence numbers are globally unique within the event stream 402. It will also be understood that in some cases, the globally unique sequence identifiers may be implied. For example, where a number of messages (e.g., at the application layer) are communicated in a single network packet (e.g., at the network layer), the first message in the network packet may have an explicit sequence number, and the sequence number of subsequent messages in the packet may be inferred based on their order within the packet.

In addition to assigning sequence numbers, the sequencer may append any additional information necessary or helpful for operation of the system. For example, the sequencer may digitally sign each message, and/or digitally sign the time stamp or other information (e.g., the sequence number) within each message. The sequencer may also or instead include a signature and/or time stamp from the source application if such information is provided by the source. Alternatively, where secure or authenticated activity is necessary or helpful, the sequencer may authenticate digital signatures from source applications before sequencing messages, or otherwise take steps to cryptographically or otherwise verify the source and/or contents of unsequenced messages received on the event stream 402. More generally, the sequencer may apply any suitable technique to receive unsequenced messages and arrange and publish them in a sequenced order, e.g., with globally unique, monotonically increasing sequence numbers, as well as any useful techniques for ensuring security, authenticity, chronological accuracy, and so forth.

Figure 5:
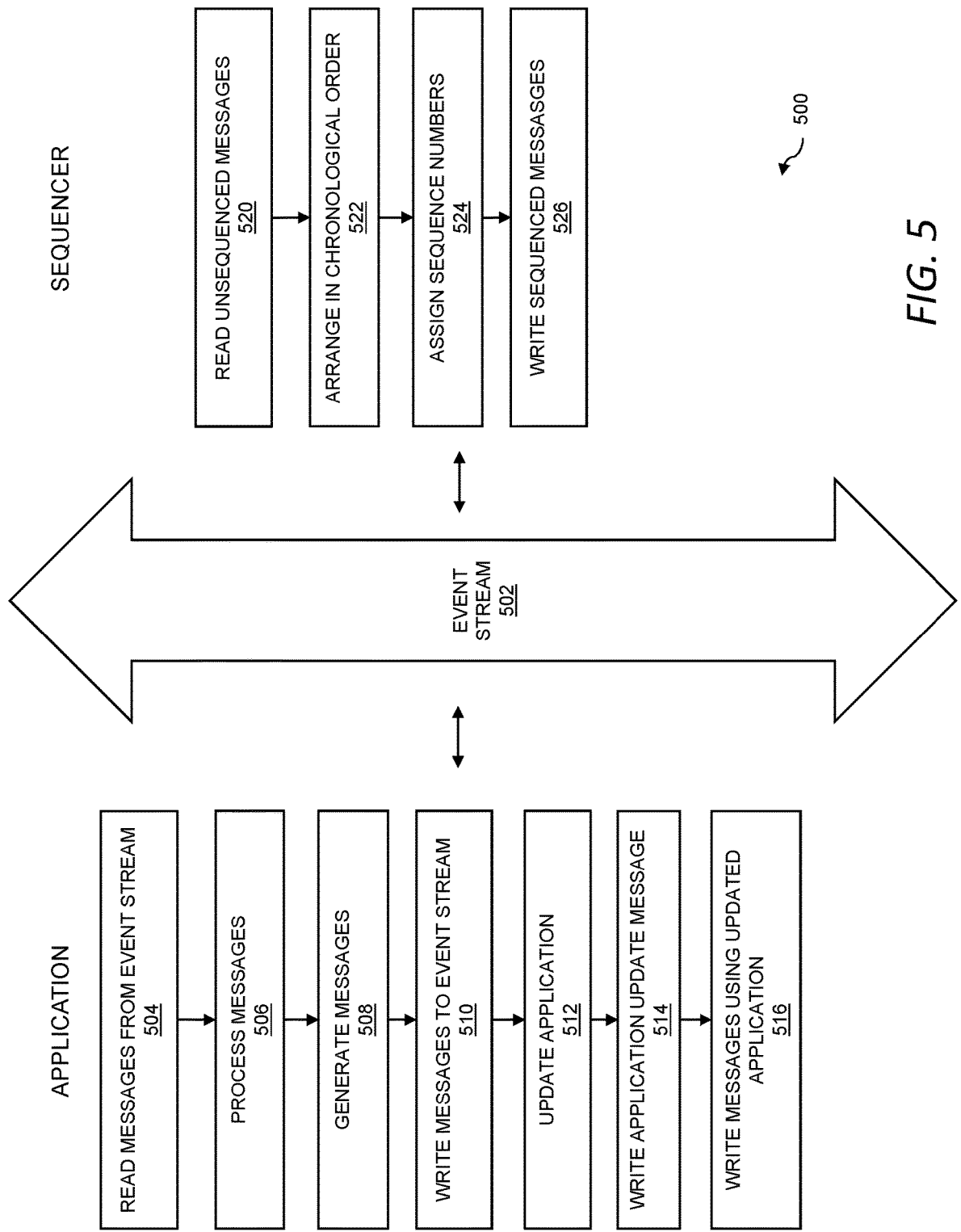
FIG. 5 shows a method for managing code updates on an event stream.

FIG. 5 shows a method for managing application code updates using an event stream. This method 500 may include any of the steps described herein including those for managing schema updates above, with differences as noted below. In a system such as any of those described herein, an identifier for a current version of code for an application may be published in a message to a shared event stream. Any instances of the application within the system may update to this current version before processing other messages having reference sequence numbers after the message containing the identifier. In this manner, multiple instances of the application may be periodically updated to maintain global consistency of the application(s) and the shared event stream.

As shown in step 504, the method 500 may begin with the application reading sequenced messages from the event stream 502, each of the sequenced messages including a sequence number such as any of the globally unique sequence identifiers described herein. These may, for example, include monotonically increasing numbers assigned by the sequencer. Each sequence number may be a globally unique sequence number within the event stream 502 in order to establish and ensure a globally consistent view of messages within a system by applications using the event stream 502. As described above, reading sequenced messages may also include filtering the sequenced messages to remove one or more of the sequenced messages from a local queue for an application.

As shown in step 506 the method 500 may include processing the sequenced messages with the application, e.g., with a processing engine of the application. This may include decoding messages from other applications using schemas previously published by those applications to the event stream. This may also or instead include processing the sequenced messages with an order of execution determined by the sequence numbers.

As shown in step 508, the method may include generating messages responsive to the sequenced messages received on the event stream 502. This may result, for example, include a number of unsequenced messages responsive to the sequenced messages, or other messages independently generated by the application, e.g., in response to external inputs or stimuli. In general, the application may generate these messages using a first schema identified by a first schema identifier, e.g., that specifies the schema being used by the application. The schema identifier may be placed onto the event stream 502 in a separate schema update message, or the schema identifier may be included in each message generated by the application using the schema, all as described above. The application may also be identified by a version number or other similar identifier, which may be included in messages from the application in order for other applications to detect and suitably respond to changes in the application as described herein.

As shown in step 510, the method 500 may include writing a first number of unsequenced messages to the event stream based on the current version of the application, as identified in the first version identifier. These unsequenced messages will typically be without any sequence numbers, which are instead assigned subsequently by the sequencer, although in one aspect, local sequencer numbers may be used, and in another aspect, the messages may include reference sequence numbers that identify the sequence numbers for other inbound messages to which the application is responding.

As shown in step 512, the method 500 may include updating the application code. For example, this may include, in response to identifying one of the sequenced messages containing a second version number for the application, retrieving a different version of the application corresponding to the second version number and replacing the application with the different version of the application. This usefully permits an update instruction to be received from another source within the system using the event stream 502 (subject to any suitable authentication or the like), or for an update to an instance of an application to automatically propagate to any parallel and/or redundant instances of the application within the system. For multiple, sequential updates, this may further include, in response to a sequenced message containing a second version number, retrieving the different version of the application (corresponding to the second version number) from a code repository. The update may also or instead be performed based on a direct interaction with the application through any suitable programming interface, e.g., by an owner or administrator of the application. The mechanics of the code update will depend on the programming environment and the complexity of the application code and may generally employ any techniques suitable for updating multiple instances of code, e.g., in a computationally or geographically distributed computing environment. The update may include changes to objects, function libraries, code components, and so forth, and may be performed using reflection, installers, uninstallers, updaters, compilers, and so forth to assist with incremental or complete code updates/replacements as appropriate.

As shown in step 514, the method 500 may include writing an application update message to the event stream with a second version number that identifies the updated version of the application code. It will be appreciated that, in complementary fashion, the method 500 may include receiving an application update message from another application (with a new version number and one of the sequence numbers) on the event stream 502, and interpreting messages from the other application (and having reference sequence numbers greater than or equal to the sequence number for the application update message) accordingly. This may also or instead include a schema change as described above. In this context, the application may process the sequenced messages having a reference sequence number less than the sequence number of the application update message based on the prior application version and may process sequenced messages having a reference sequence number greater than or equal to the sequence number of the application update message based on the updated application version.

As shown in step 516, the method 500 may include, after writing the application update message to the event stream 502 (or concurrently with writing the schema change message to the event stream 502), writing unsequenced messages to the event stream using the updated application code, e.g., using a writer for the application. Each message may optionally include a current version number for the application code corresponding to each message, as well as a reference sequence number for an inbound message to which the application is responding. Each unsequenced message may also be digitally signed and/or time stamped by the application before writing to the event stream 502. As described below, an application may maintain multiple instances or versions in order to execute incoming messages using application logic synchronized to the reference sequence number from the message source. To maintain these multiple instances, the application may use pointers to different binary versions, or any other suitable mechanism for making multiple versions available as needed for the temporal state of event stream users. In this context, the temporal state may be measured based on, e.g., the oldest reference sequence number currently in use among the most recent sequenced messages of all of the applications using the event stream.

Concurrently with execution of the application, a sequencer may operate to sequence messages and publish them to the event stream 502 as generally described herein. For example, this may include reading unsequenced messages from the event stream as shown in step 520, arranging the unsequenced messages in a chronological order, e.g., according to a time of arrival at the sequencer, as shown in step 522, assigning monotonically increasing sequence numbers to the unsequenced messages according to the chronological order as shown in step 524, and writing the unsequenced messages with the monotonically increasing sequence numbers to the event stream as sequenced messages as shown in step 526. The sequencer may also or instead perform additional steps and append additional information. For example, the sequencer may add time stamps to incoming unsequenced events at the time of arrival. The sequencer may also or instead verify message sources for some or all of the messages based on a digital signature from the source or any other available information. The sequencer may also or instead digitally sign outbound, sequenced messages, and/or contents thereof. More generally, the sequencer may apply any suitable technique to receive unsequenced messages, arrange the messages in chronological order, and publish the messages in a sequenced order, e.g., with unique, monotonically increasing sequence numbers.

Figure 6:
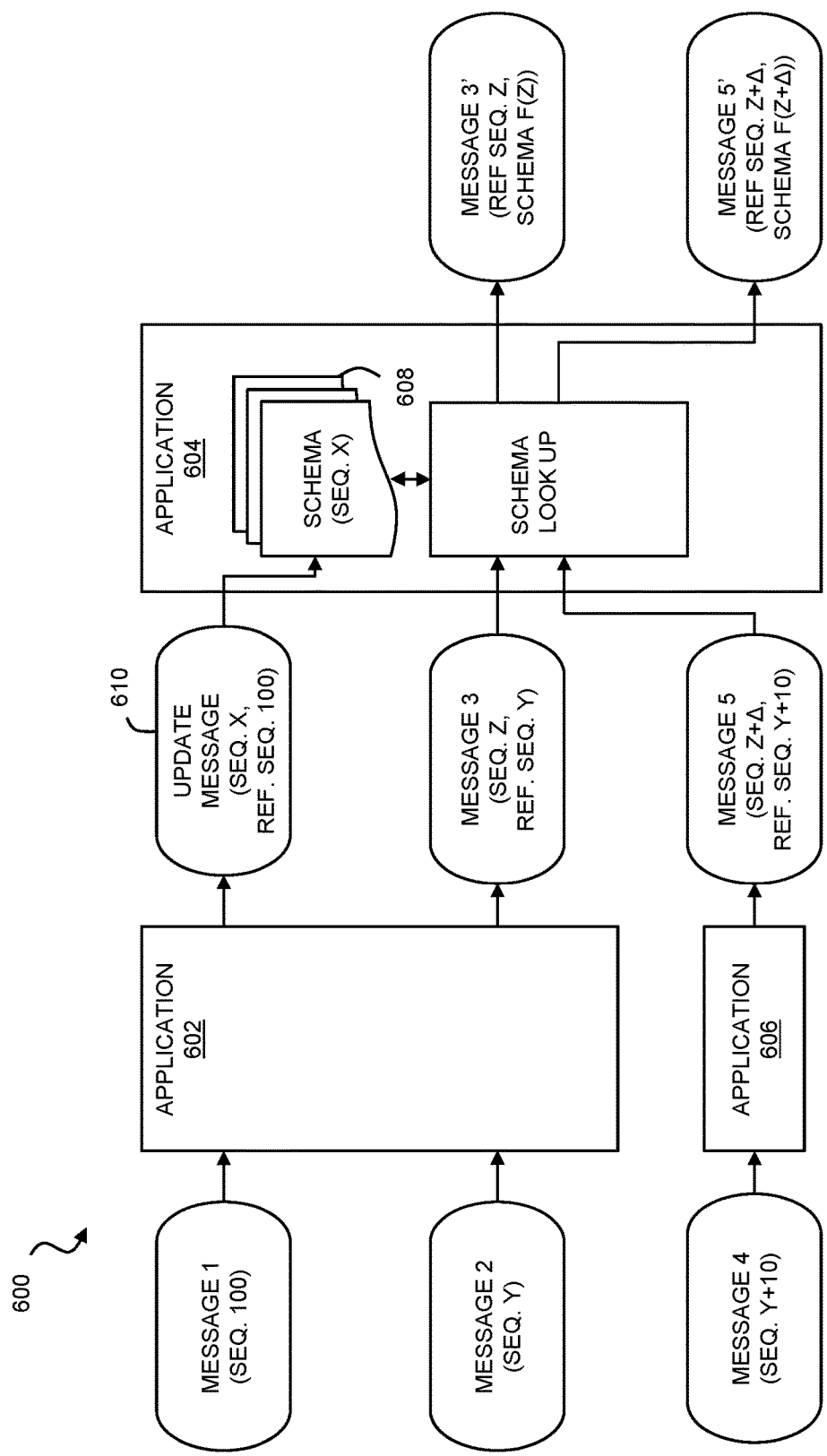
FIG. 6 illustrates a technique for managing versions of schemas or code as they are updated.

FIG. 6 illustrates a technique for managing versions of schemas or application logic as they are updated. It will be noted that the architecture described herein does not generally guarantee that messages from applications will be received by a sequencer in the order of creation, or that these messages from applications are received at all. This creates the possibility for race conditions, e.g., where one application publishes an update to a schema or binary code, but before that schema update is sequenced and available to other applications, the other applications have generated messages relying on the prior version, and thus using a now outdated schema, or relying on an outdated processing model. At best, this may result in ambiguity in the results of subsequent communications. At worst, it may result in system failures.

In order to resolve these potential race conditions, each application writing to the event stream may include a reference sequence number as described above that explicitly identifies the sequence number that an output is responding to, or where there is no specific preceding input, a most recent sequenced message received by the application. This reference sequence number may be included in an output message from an application and used by receiving applications to select the temporally correct (input or output) schema from among for applications receiving output message. For simplicity, the following description refers to schema updates, however it should be understood that the same technique may be used to synchronize code updates, e.g., using pointers to binary for different versions, and the following description should be understood to apply to code updates as well as schema updates, unless explicitly noted to the contrary.

As shown in FIG. 6, a system 600 may include a number of applications such as a first application 602, a second application 604, and a third application 606, as well as a repository 608 of schema definitions, which may be stored locally at one of the applications, remotely at a central data repository, or some combination of these. In general, the repository 608 may store complete and/or incremental schema descriptions for communications with other application in a manner that permits a selection of schemas based on the current sequence number. Using this repository, the second application 604 may apply all sequence-dependent schemas synchronized to the globally unique identifiers for sequenced messages on the event stream. For example, when the second application 604 reads a message, the second application 604 may apply all schema update messages for a source application up to and including any schema update corresponding to the reference sequence number for the inbound message. When the second application 604 writes a message to other applications, the second application 604 may apply all schema update messages up to and including any schema update messages corresponding to the reference sequence number for the outbound number (e.g., a sequence number for an inbound message that triggered the outbound message). In this context, applying a schema update for the reference sequence number itself (e.g., for schemas up to and including the reference number) ensures consistency for cases in which a schema update message triggers the output message.

In general, the first application 602 may receive message 1, and may subsequently output a schema update message 610 that is sequenced with globally unique sequence identifier X. In general, message 1 may be an external instruction for the first application 602 to revise a schema, or message 1 may simply be a most recently received, sequenced message before the first application 602 independently initiates a schema change. The schema update message may contain a definition of a schema that the first application 602 will use to interpret data in inbound messages after the globally unique sequence identifier, X, or a schema that the first application 602 will use to format data in outbound messages after the globally unique sequence identifier, or some combination of these. The schema update message may also or instead include a pointer to a remote resource containing any of the foregoing.

When the second application 604 receives the schema update message 610, the second application 604 may, as necessary, retrieve and/or locally store the new schema information applicable to messages to/from the first application 602 having reference sequence numbers greater than (or equal to) the globally unique sequence identifier, X, for the schema update message 610. This timing rule may ensure that only application messages issued and sequenced after the schema update message has been processed by the application—i.e., because they have an input reference sequence number greater than or equal to the globally unique sequence number of the schema update—will use the updated schema, while messages with reference sequence numbers less than the globally unique sequence identifier, X, will globally continue to use the earlier schema version(s). While this general approach permits applications to self-manage their own schemas, it will be understood that a separate application may also or instead be used to manage schema change requests and issue schema update messages. This may enable central control of schema formats, e.g., to ensure that schemas follow any desired system-wide rules on syntax, format, content, etc. More generally, each schema and a corresponding, globally unique sequence identifier, may be stored by each application, or alternatively in some central repository for use in determining the appropriate schema for processing inbound and outbound messages. In any case, by referencing schema updates temporally to the globally unique sequence identifiers, the system can ensure consistency of schemas across applications using the event stream.

Independent of the schema update above, the first application 602 may receive message 2 having globally unique sequence identifier, Y, and in response, generate message 3. Message 3 will use Y as its reference sequence number, and may subsequently be received by the sequencer and sequenced with globally unique sequence identifier, Z. When message 3 is received by the second application 604, the second application 604 may retrieve the schema stored in the schema definitions 608 up to and including schema updates corresponding to globally unique sequence identifier, 100, the reference sequence number for the incoming message. This schema may then be used by the second application 604 to process the content of message 3.

As indicated, in response to message 3, the second application 604 may also send a reply message, message 3', e.g., to the first application 602 or to some other application. In this outbound message 3', the second application 604 may select a suitable schema based on the outbound message's reference sequence number, e.g., the sequence number for message 3, which is globally unique sequence number, Z. For message 3', the second application will apply all appropriate schema updates up to and including any schema updates for the reference sequence number, Z, for message 3'.

Similarly, where message 5 is received from a third application 606, independent from the schema update by the first application 602, a schema lookup may be performed for the inbound message 5 based on the reference sequence number, Y+10, and a schema lookup for an outbound, responsive message 5' based on the reference sequence number Z+A for message 5', which is also the sequence number for predicate inbound message 5.

According to the foregoing, processing an inbound message with an application according to a dynamic schema as described herein may include processing an inbound message to the application using an updated schema based on all applicable schema update messages having globally unique sequence identifiers up to and including a reference sequence number for the inbound message. Writing an outbound message from an application may include writing the outbound message from the application using an updated schema based on all applicable schema update messages having globally unique sequence identifiers up to and including a reference sequence number for the outbound message. Similarly, with respect to application versions, processing an inbound message with an application may include processing an inbound message received by the application using an updated version of the application based on all revisions to the application up to and including any revisions corresponding to a reference sequence number for the inbound message. Conversely, processing an outbound message written from the application may include processing the outbound message using an updated version of the application based on all revisions to the application up to and including any revisions corresponding to a reference sequence number for the outbound message.

The above systems, devices, methods, processes, and the like may be realized in hardware, software, or any combination of these suitable for a particular application. The hardware may include one or more general-purpose computers, dedicated computing devices, cloud-based computing devices, virtual computers, and so forth. This includes realization in one or more microprocessors, microcontrollers, embedded microcontrollers, programmable digital signal processors or other programmable devices or processing circuitry, along with internal and/or external memory. This may also, or instead, include one or more application specific integrated circuits, programmable gate arrays, programmable array logic components, or any other device or devices that may be configured to process electronic signals. It will further be appreciated that a realization of the processes or devices described above may include computer-executable code created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software. In another aspect, the methods may be embodied in systems that perform the steps thereof and may be distributed across devices in a number of ways. At the same time, processing may be distributed across devices such as the various systems described above, or all of the functionality may be integrated into a dedicated, standalone device or other hardware. In another aspect, means for performing the steps associated with the processes described above may include any of the hardware and/or software described above. All such permutations and combinations are intended to fall within the scope of the present disclosure.

Embodiments disclosed herein may include computer program products comprising computer-executable code or computer-usable code that, when executing on one or more computing devices, performs any and/or all of the steps thereof. The computer program product may include non-transitory computer-executable code, which may be stored, e.g., in a non-transitory computer-readable memory such as a memory from which the program executes (such as random-access memory associated with a processor) or a storage device such as a disk drive, flash memory or any other optical, electromagnetic, magnetic, infrared, or other device or combination of devices. In another aspect, any of the systems and methods described above may be embodied in any suitable transmission or propagation medium carrying computer-executable code and/or any inputs or outputs from same.

The method steps of the implementations described herein are intended to include any suitable method of causing such method steps to be performed, consistent with the patentability of the following claims, unless a different meaning is expressly provided or otherwise clear from the context. So, for example, performing the step of X includes any suitable method for causing another party such as a remote user, a remote processing resource (e.g., a server or cloud computer) or a machine to perform the step of X. Similarly, performing steps X, Y, and Z may include any method of directing or controlling any combination of such other individuals or resources to perform steps X, Y, and Z to obtain the benefit of such steps. Thus, method steps of the implementations described herein are intended to include any suitable method of causing one or more other parties or entities to perform the steps, consistent with the patentability of the following claims, unless a different meaning is expressly provided or otherwise clear from the context. Such parties or entities need not be under the direction or control of any other party or entity and need not be located within a particular jurisdiction.

It will be appreciated that the methods and systems described above are set forth by way of example and not of limitation. Absent an explicit indication to the contrary, the disclosed steps may be modified, supplemented, omitted, and/or re-ordered without departing from the scope of this disclosure. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context. Thus, while particular embodiments have been shown and described, it will be apparent to those skilled in the art that various changes and modifications in form and details may be made therein without departing from the spirit and scope of this disclosure and are intended to form a part of the present teachings as defined by the following claims.

What is claimed is:

1. A method comprising:
   reading sequenced messages from an event stream, the sequenced messages including globally unique sequence identifiers;
   writing first unsequenced messages to the event stream from an application, the first unsequenced messages having no globally unique sequence identifiers;
   in response to identifying one of the sequenced messages containing a second version number for the application different than a first version number corresponding to a current version of the application, retrieving a different version of the application corresponding to the second version number and replacing the current version of the application with the different version of the application; and
   processing one or more of the sequenced messages having a reference sequence number greater than or equal to one of the globally unique sequence identifiers for the one of the sequenced messages containing the second version number using the different version of the application.

2. The method of claim 1 wherein the globally unique sequence identifiers are monotonically increasing numbers assigned by a sequencer for the event stream according to a time received by the sequencer.

3. The method of claim 2 further comprising adding a time stamp to each of the sequenced messages with the sequencer.

4. The method of claim 1 wherein the globally unique sequence identifiers include monotonically increasing sequence numbers assigned according to an arrival at a sequencer.

5. The method of claim 1 further comprising, in response to the one of the sequenced messages containing the second version number, retrieving the different version of the application from a code repository.

6. The method of claim 1 further comprising, in response to the one of the sequenced messages containing the second version number, retrieving the different version of the application from the event stream.

7. The method of claim 1 further comprising including a corresponding one of the first version number or the second version number in each of the unsequenced messages from the application indicating a source application version associated with each of the unsequenced messages.

8. The method of claim 1 further comprising executing a plurality of instances of the application at a plurality of venues coupled in a communicating relationship with the event stream.

9. The method of claim 1 further comprising digitally signing each of the unsequenced messages before writing to the event stream.

10. The method of claim 1 further comprising filtering the sequenced messages to remove one or more of the sequenced messages from a local queue for the application.

11. The method of claim 1 wherein the application processes the sequenced messages with an order of execution determined by the globally unique sequence identifiers.

12. The method of claim 1 further comprising processing one of the sequenced messages having a reference identifier preceding a first globally unique sequence identifier of the sequenced messages containing the second version number with a version of the application corresponding to the first version number.

13. The method of claim 1 further comprising sequencing messages on the event stream by:
   reading second unsequenced messages from the event stream;
   applying a time stamp to each of the second unsequenced messages corresponding to a time received at a sequencer;
   arranging the second unsequenced messages in a chronological order according to the time received at the sequencer;
   assigning monotonically increasing sequence numbers to the second unsequenced messages according to the chronological order; and
   writing the second unsequenced messages to the event stream using the monotonically increasing sequence numbers as the globally unique sequence identifiers.

14. The method of claim 1 further comprising processing an inbound message received by the application using an updated version of the application based on all revisions to the application up to and including any revisions corresponding to a reference sequence number for the inbound message.

15. The method of claim 1 further comprising processing an outbound message written from the application using an updated version of the application based on all revisions to the application up to and including any revisions corresponding to a reference sequence number for the outbound message.

16. A computer program product comprising a non-transitory computer readable medium storing computer executable code that, when executing on one or more computing devices, updates application logic in a processing system by performing the steps of:
   reading sequenced messages from an event stream, the sequenced messages including sequence numbers;
   processing the sequenced messages with an application identified by a first version number;

writing first unsequenced messages from the application to the event stream, the first unsequenced messages having no sequence numbers;

in response to identifying one of the sequenced messages containing a second version number for the application, retrieving a different version of the application corresponding to the second version number and replacing the application with the different version of the application; and processing one or more of the sequenced messages having a reference sequence number greater than or equal to one of the sequence numbers for the one of the sequenced messages containing the second version number according to the different version of the application.

17. The computer program product of claim 16 further comprising code that sequences messages on the event stream by performing the steps of:

reading second unsequenced messages from the event stream;

applying a time stamp to each of the second unsequenced messages corresponding to a time received at a sequencer;

arranging the second unsequenced messages in a chronological order according to the time received at the sequencer;

assigning monotonically increasing sequence numbers to the second unsequenced messages according to the chronological order; and writing the second unsequenced messages to the event stream as sequenced messages using the monotonically increasing sequence numbers as the sequence numbers.

18. The computer program product of claim 16 wherein the sequence numbers are monotonically increasing numbers assigned by a sequencer for the event stream according to a time received by the sequencer, and wherein each of the sequence numbers is a globally unique sequence number within the event stream.

19. The computer program product of claim 16 further comprising code that performs the step of processing an inbound message received by the application using an updated version of the application based on all revisions to the application up to and including any revisions corresponding to a reference sequence number for the inbound message.

20. The computer program product of claim 16 further comprising code that performs the step of processing an outbound message written from the application using an updated version of the application based on all revisions to the application up to and including any revisions corresponding to a reference sequence number for the outbound message.

21. A computing system, comprising:
one or more processors; and
a memory coupled with the one or more processors, wherein the one or more processors execute a processing system stored in the memory, the processing system comprising:
a sequencer that receives unsequenced messages from users of an event stream, arranges the unsequenced messages into sequenced messages having globally unique sequence identifiers in the event stream, and publishes the sequenced messages to the event stream; and
an application coupled in a communicating relationship with the event stream and the sequencer, the application including (i) a writer configured to publish one or more of the unsequenced messages, (ii) a reader to read one or more of the sequenced messages from the event stream, and (iii) a processing engine configured to process messages by at least one of (a) processing one or more of the sequenced messages received on the event stream or (b) creating one or more of the unsequenced messages for writing to the event stream,
the application responsive to identifying one of the sequenced messages containing a second version number for the application different than a first version number corresponding to a current version of the application by sending a second message to the event stream containing an updated version number for the application corresponding to an updated version of the processing application, thereby causing a retrieval of an updated version of the application corresponding to the second version number and replacement of the current version of the application with the updated version of the application.

22. The computing system of claim 21, wherein the application responds to the updated version number for the application received on the event stream by updating the processing engine of the application to an updated version.

23. The computing system of claim 22, wherein the updated version of the processing engine is configured to process one or more of the sequenced messages having a reference sequence number greater than or equal to one of the globally unique sequence identifiers for the one of the sequenced messages containing the updated version number.

24. The computing system of claim 21, wherein the application is updated out-of-band from the event stream.

25. A computing system, comprising:
one or more processors; and
a memory coupled with the one or more processors, wherein the one or more processors execute a processing system stored in the memory, the processing system comprising:
a sequencer that receives unsequenced messages from users of an event stream, arranges the unsequenced messages into sequenced messages having globally unique sequence identifiers in the event stream, and publishes the sequenced messages to the event stream; and
an application coupled in a communicating relationship with the event stream and the sequencer, the application including (i) a writer configured to publish one or more of the unsequenced messages, (ii) a reader to read one or more of the sequenced messages from the event stream, and (iii) a processing engine configured to process messages by at least one of (a) processing one or more of the sequenced messages received on the event stream or (b) creating one or more of the unsequenced messages for writing to the event stream,
the application responsive to identifying one of the sequenced messages containing a second version number for the processing engine different than a first version number corresponding to a current version of the processing engine by updating the processing engine to an updated version, wherein updating the processing engine to the updated version comprises:
retrieving a different version of the processing engine corresponding to the second version number; and replacing the current version of the processing engine with the different version of the processing engine.

26. The computing system of claim 25, wherein the updated version of the processing engine is configured to process one or more of the sequenced messages having a reference sequence number greater than or equal to one of the globally unique sequence identifiers for the one of the sequenced messages containing the second version number.

\* \* \* \* \*